United States Patent [19]

Kioka et al.

[11] Patent Number: 5,091,352

[45] Date of Patent: *Feb. 25, 1992

[54] OLEFIN POLYMERIZATION CATALYST COMPONENT, OLEFIN POLYMERIZATION CATALYST AND PROCESS FOR THE POLYMERIZATION OF OLEFINS

[75] Inventors: Mamoru Kioka; Toshiyuki Tsutsui; Akinori Toyota, all of Kuga, Japan

[73] Assignee: Mitsui Petrochemical Industries, Ltd., Tokyo, Japan

[ * ] Notice: The portion of the term of this patent subsequent to Feb. 5, 2008 has been disclaimed.

[21] Appl. No.: 407,436

[22] Filed: Sep. 14, 1989

[30] Foreign Application Priority Data

| Sep. 14, 1988 | [JP] | Japan | 63-231201 |
| Sep. 14, 1988 | [JP] | Japan | 63-231202 |
| Sep. 14, 1988 | [JP] | Japan | 63-231203 |
| Sep. 14, 1988 | [JP] | Japan | 63-231204 |
| Sep. 14, 1988 | [JP] | Japan | 63-231208 |
| Sep. 14, 1988 | [JP] | Japan | 63-231209 |
| Sep. 14, 1988 | [JP] | Japan | 63-231210 |
| Sep. 14, 1988 | [JP] | Japan | 63-231211 |
| Sep. 14, 1988 | [JP] | Japan | 63-231212 |
| Mar. 28, 1989 | [JP] | Japan | 1-75605 |
| Mar. 28, 1989 | [JP] | Japan | 1-75606 |
| Mar. 28, 1989 | [JP] | Japan | 1-75607 |
| Mar. 28, 1989 | [JP] | Japan | 1-75611 |
| Mar. 28, 1989 | [JP] | Japan | 1-75612 |
| Mar. 28, 1989 | [JP] | Japan | 1-75613 |
| Mar. 28, 1989 | [JP] | Japan | 1-75614 |
| Mar. 28, 1989 | [JP] | Japan | 1-75615 |

[51] Int. Cl.$^5$ .......................... C08F 4/64; C08F 4/68; C08F 4/69

[52] U.S. Cl. .................... 502/103; 502/110; 502/117; 556/179; 526/160; 526/153

[58] Field of Search .......... 502/103, 110, 117; 556/179

[56] References Cited

U.S. PATENT DOCUMENTS

| 3,524,870 | 8/1970 | Matzek et al. | 556/181 |
| 3,736,342 | 5/1973 | Ichiki et al. | 556/181 |
| 4,250,104 | 2/1981 | Giannini et al. | 556/179 |
| 4,397,762 | 8/1983 | Johnstone | 502/117 X |
| 4,404,344 | 9/1983 | Sinn et al. | 502/117 X |
| 4,542,199 | 9/1985 | Kaminsky et al. | 502/103 X |
| 4,658,078 | 4/1987 | Slaugh et al. | 502/117 X |
| 4,665,208 | 5/1987 | Welborn et al. | 502/117 X |
| 4,668,838 | 5/1987 | Briggs | 502/117 X |
| 4,701,432 | 10/1987 | Welborn | 502/117 X |
| 4,808,561 | 2/1989 | Welborn | 502/103 X |
| 4,841,004 | 6/1989 | Kaminsky et al. | 502/117 X |
| 4,990,640 | 2/1991 | Tsutsui et al. | 556/181 |

OTHER PUBLICATIONS

H. Sinn et al., Institute for Technical and Macromolecular Chemistry, University of Hamburg, "Some New Results on Methyl-Aluminoxane".

*Primary Examiner*—Patrick P. Garvin
*Attorney, Agent, or Firm*—Sherman and Shalloway

[57] ABSTRACT

In accordance with the present invention, there are provided olefin polymerization catalyst components comprising an organoaluminum oxy-compound having less than 10% in terms of Al atom of Al component dissolving in benzene kept at 60° C., and olefin polymerization catalyst containing said olefin polymerization catalyst components. The olefin polymerization catalysts have excellent polymerization activities, and are capable of giving olefin (co)polymers having a narrow molecular weight distribution and a narrow composition distribution.

15 Claims, 2 Drawing Sheets

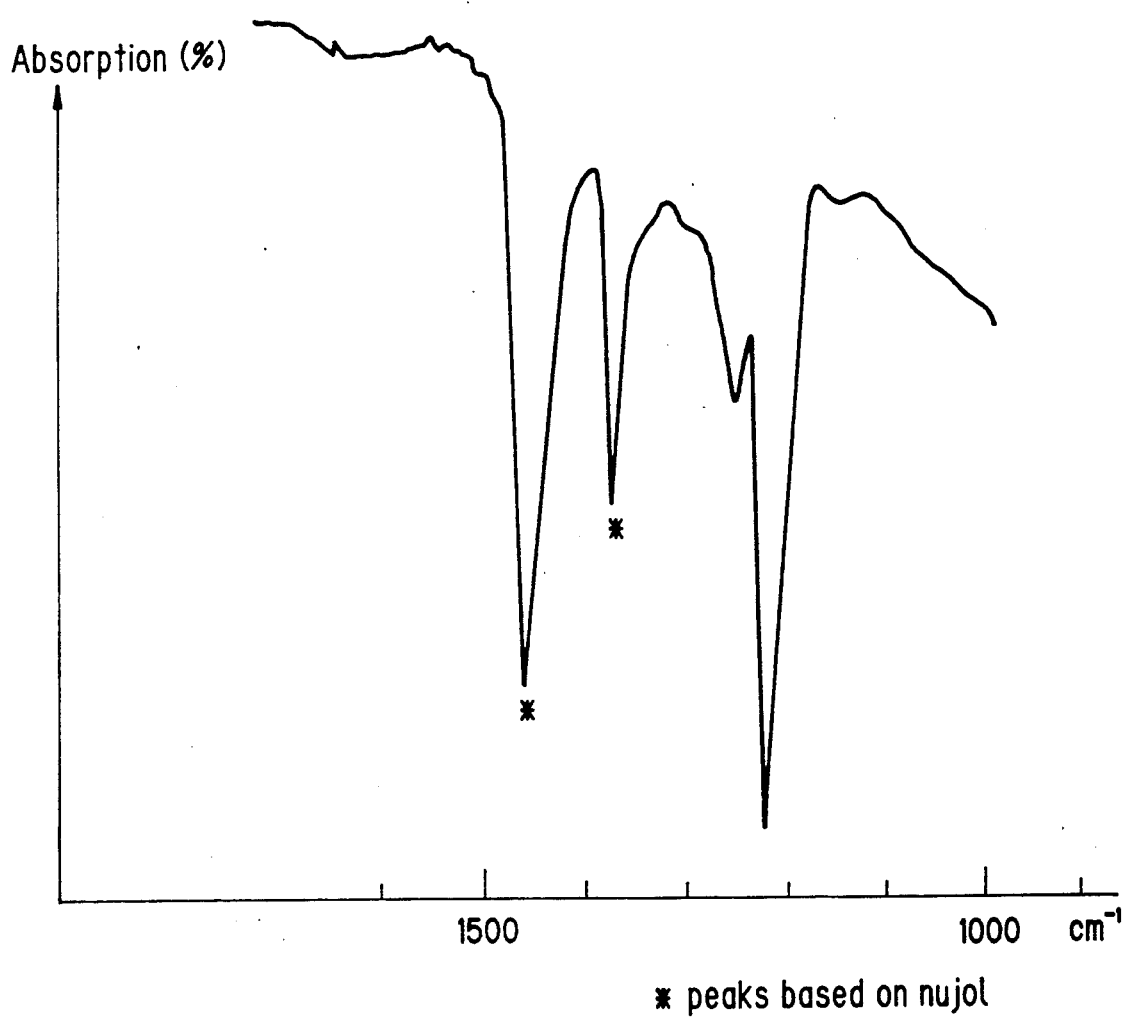

OLEFIN POLYMERIZATION CATALYST COMPONENT, OLEFIN POLYMERIZATION CATALYST AND PROCESS FOR THE POLYMERIZATION OF OLEFINS

FIELD OF THE INVENTION

This invention relates to olefin polymerization catalyst components, olefin polymerization catalyst and process for the polymerization of olefins, and more particularly to novel olefin polymerization catalyst components and olefin polymerization catalysts having excellent polymerization activities and capable of giving olefin (co)polymers having a narrow molecular weight distribution and a narrow composition distribution.

BACKGROUND OF THE INVENTION

It has heretofore been known that titanium based catalysts composed of a titanium compound and an organoaluminum compound, or vanadium based catalysts composed of a vanadium compound and an organoaluminum compound are used as catalyst for the preparation of α-olefin polymers, for example, ethylene polymers or ethylene/α-olefin copolymers.

Generally, ethylene/α-olefin copolymers obtained with the titanium based catalysts have a broad molecular weight distribution and a broad composition distribution and are poor in transparency, surface non-tackiness and dynamical properties. Ethylene/α-olefin copolymers obtained with the vanadium based catalyst have a narrow molecular weight distribution and a narrow composition distribution in comparison with the ethylene/α-olefin copolymers obtained with the titanium based catalysts, and show a fairly good improvement in transparency, surface non-tackiness and dynamical properties, but said catalyst are low in polymerization activities and the resulting ethylene/α-olefin copolymers require deashing operation. Thereafter, it is desired that catalyst systems further improved in these properties and developed to make their appearance.

Under such circumstances, on the one hand, there have been proposed recently processes for the preparation of ethylene/α-olefin copolymers using catalysts composed of zirconium compounds and aluminoxanes as a new type of Ziegler catalysts for olefin polymerization.

For example, Japanese Patent L-O-P Publn. No. 19309/1983 disclosed a process for the preparation of ethylene/α-olefin copolymers, which process comprises polymerizing ethylene and one or at least two $C_3$–$C_{12}$ α-olefins at a temperature of from −50° C. to 200° C. in the presence of a catalyst composed of a transition metal containing compound represented by the following formula $(Cyclopentadienyl)_2MeRHal$ wherein R is cyclopentadienyl, $C_1$–$C_6$ alkyl or halogen, Me is a transition metal and Hal is halogen, and a linear aluminoxane represented by the following formula $Al_2OR_4(Al(R)-O)_n$ wherein R is methyl or ethyl, and n is a number of from 4 to 20, or a cyclic aluminoxane represented by the following formula

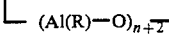

wherein R and n are as defined above. This patent L-O-P publication teaches that in order to regulate the density of the resulting polyethylene, the polymerization of ethylene should be carried out in the presence of small quantities of up to 10% by weight of fairly long chain α-olefins or mixtures thereof.

Japanese Patent L-O-P Publn. No. 95292/1984 discloses an invention relating to processes for preparing a linear aluminoxanes represented by the following formula

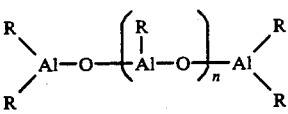

wherein n is a number of from 2 to 40, and R is $C_1$–$C_6$ alkyl, and a cyclic aluminoxane represented by the following formula

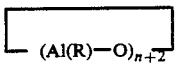

wherein n and R are as defined above.

This patent L-O-P publication describes that when the polymerization of ethylene is carried out in the presence of a mixture comprising the aluminoxane prepared by the process of said publication, for example, methyl aluminoxane, and a bis(cyclopentadienyl)zirconium compound or a bis(cyclopentadienyl)titanium compound, there are obtained at least twenty-five million grams of polyethylene per 1 g of the transition metal and per 1 hour.

Japanese Patent L-O-P Publn. No. 35005/1985 discloses a process for preparing olefin polymerization catalyst, which comprises first reacting an aluminoxane compound represented by the following formula

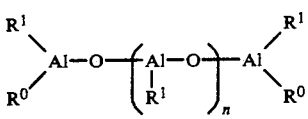

wherein $R^1$ is $C_1$–$C_{10}$ alkyl, and $R^0$ is $R^1$ or $R^0$ represents —O— by linkage, with a magnesium compound, and then chlorinating the reaction product, followed by treatment with a compound of Ti, V, Zr or Cr. This patent L-O-P publication describes that the catalysts prepared by the process are particularly suitable for use in copolymerization of ethylene and $C_3$–$C_{12}$ α-olefins.

Japanese Patent L-O-P Publn. No. 35006/1985 discloses a combination of (a) two or more dissimilar mono-, di- or tri-cyclopentadienyls or their derivatives of transition metals and (b) an aluminoxane as a catalyst for preparation of reactor blended polymers. Example 1 of this Patent L-O-P publication discloses that ethylene and propylene are polymerized in the presence of a catalyst composed of bis(pentamethylcyclopentadienyl)dimethyl zirconium and an aluminoxane to obtain polyethylene having a number average molecular weight of 15,300, a weight average molecular weight of 36,400 and containing 3.4% of the propylene component. In Example 2 of this patent L-O-P publication, ethylene and propylene are polymerized in the presence of a catalyst composed of bis(pentamethylcyclopentadienyl)zirconium dichloride, bis(methylcylcopentadienyl)zirconium dichloride and an aluminoxane to obtain a blend of polyethylene and an ethylene/propylene copolymer consisting of a toluene-soluble portion having a number average molecular weight of 2,200 and a weight average molecular weight of 11,900 and containing 30 mol% of the propylene component and a toluene-insoluble portion having a number average molecular weight of 3,000 and a weight average molecular weight of 7,400 and containing 4.8 mol% of the propylene component, said blend having a number average molecular weight of 2,000 and a weight average molecular weight of 8,300 and containing 7.1 mol% of the propylene component. Similarly, Example 3 discloses a blend of LLDPE and an ethylene/propylene copolymer consisting of a soluble portion having a molecular weight distribution ($\overline{Mw}/\overline{Mn}$) of 4.57 and containing 20.6 mol% of the propylene component and an insoluble portion having a molecular weight distribution of 3.04 and containing 2.9 mol% of the propylene component.

Japanese Patent L-O-P Publn. No. 35007/1985 discloses a process wherein ethylene alone is polymerized, or ethylene and an α-olefin of 3 or more carbon atoms are copolymerized in the presence of a catalyst system containing a metallocene and a cyclic aluminoxane represented by the following formula

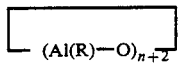

wherein R is an alkyl group of 1 to 5 carbon atoms, and n is an integer of 1 to about 20, or a linear aluminoxane represented by the following formula

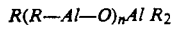

wherein R and n are as defined above.

According to this patent L-O-P publication, the polymers obtained in this manner have a weight average molecular weight of about 500 to about 1,400,000 and a molecular weight distribution of 1.5 to 4.0.

Japanese Patent L-O-P Publn. No. 35008/1985 discloses that polyethylene or ethylene/$C_3$-$C_{10}$ α-olefins copolymers having a wide molecular weight distribution are prepared by using a catalyst system comprising at least two metallocenes and aluminoxane. This patent L-O-P publication indicates that the copolymers obtained in this manner have a molecular weight distribution ($\overline{Mw}/\overline{Mn}$) of 2-50.

Japanese Patent L-O-P Publns. Nos. 260602/1985 and 130604/1985 propose processes for polymerizing olefins by using catalysts formed from a transition metal compound and a mixed organoaluminum compound comprising a transition metal compound, aluminoxane and an organoaluminum compound, and disclose that polymerization activity per unit transition metal improves by the addition of the organoaluminum compound.

Japanese Patent L-O-P Publn. No. 36390/1987 teaches that aluminoxanes are obtained by reaction of organoaluminum compounds with iron compounds containing water of crystallization, Japanese Patent L-O-P Publn. No. 148491/1987 teaches that aluminoxanes may be obtained by reaction of organoaluminum compounds with compounds containing water of crystallization selected from the group consisting of magnesium compounds, nickel compounds and lanthanide compounds, and Japanese Patent L-O-P Publns. Nos. 56507/1988 and 56508/1988 teach that aluminoxanes can be obtained by reaction of water directly with organoaluminum compounds in inert hydrocarbon solvents utilizing a high speed, high shearing ability induction type impeller or an ultrasonic wave.

In preparing α-olefin (co)polymers in the manner now described, when the aluminoxane compounds are used as one component of the catalyst therefor, α-olefin (co)polymers having a narrow molecular weight distribution and a narrow composition distribution can be obtained with excellent polymerization activity.

However, a great desideratum for the industry concerned is the advent of such aluminoxane type organoaluminum compounds as having excellent polymerization activity on α-olefin and as being capable of giving olefin (co)polymers having a narrow molecular weight distribution and a narrow composition distribution.

In this connection, known aluminoxane compounds used hitherto in olefin polymerization, even when they are used in a state of liquid or solid, were prepared and recovered as those which are soluble in hydrocarbon solvents such as benzene or toluene, and their molecular weight was determined by cryoscopic methods after dissolving them in benzene and, moreover, a structure of said aluminoxane was decided by measuring a freezing point thereof in benzene.

In light of the foregoing points, the present inventors prosecuted extensive researches and eventually have accomplished the present invention on the basis of their fining that novel organoaluminum oxy-compounds prepared from known aluminoxanes or organoaluminum compounds which have not been known at all hitherto and which are insoluble or sparingly soluble in benzene and toluene exhibit excellent catalytic activities in olefin polymerization.

OBJECT OF THE INVENTION

The present invention has been accomplished in consideration of the prior art as mentioned above, and an object of the invention is to provide novel olefin polymerization catalyst components and olefin polymerization catalysts containing said catalyst components capable of giving olefin (co)polymers having a narrow molecular weight distribution and a narrow composition distribution, and a process for the polymerization of olefins with said olefin polymerization catalysts.

SUMMARY OF THE INVENTION

The olefin polymerization catalyst components of the present invention are characterized by comprising an organoaluminum oxy-compound [A] having less than 10% in terms of Al atom of Al component dissolving in benzene kept at 60° C.

The first olefin polymerization catalyst of the present invention is characterized by comprising

[A] an organoaluminum oxy-compound having less than 10% in terms of Al atom of Al component dissolving in benzene kept at 60 ° C., and

[B] a transition metal compound containing a ligand having a cycloalkadienyl skeleton.

The second olefin polymerization catalyst of the present invention is characterized by comprising
  [A] an organoaluminum oxy-compound having less than 10% in terms of Al atom of Al component dissolving in benzene kept at 60° C.,
  [B] a transition metal compound containing a ligand having a cycloalkadienyl skeleton, and
  [C] an organoaluminum compound.

The third olefin polymerization catalyst of the present invention is characterized by comprising
  [A] an organoaluminum oxy-compound having less than 10% in terms of Al atom of Al component dissolving in benzene kept at 60° C.,
  [B] a transition metal compound containing a ligand having a cycloalkadienyl skeleton, and
  [D] an aluminoxane having at least one hydrocarbon group other than n-alkyl group bonded to the aluminum atom.

The fourth olefin polymerization catalyst of the present invention is characterized by comprising
  [A] an organoaluminum oxy-compound having less than 10% in terms of Al atom of Al component dissolving in benzene kept at 60° C.,
  [B] a transition metal compound containing a ligand having a cycloalkadienyl skeleton,
  [C] an organoaluminum compound, and
  [D] an aluminoxane having at least one hydrocarbon group other than n-alkyl group bonded to the aluminum atom.

The process for the polymerization of olefins of the present invention is characterized by polymerizing or copolymerizing α-olefins with the olefin polymerization catalysts as illustrated above.

BRIEF DESCRIPTION OF THE DRAWINGS

FIG. 2 is a graph showing IR spectrum of a known benzene-soluble organoaluminum compound.

DETAILED DESCRIPTION OF THE INVENTION

Figure 1:
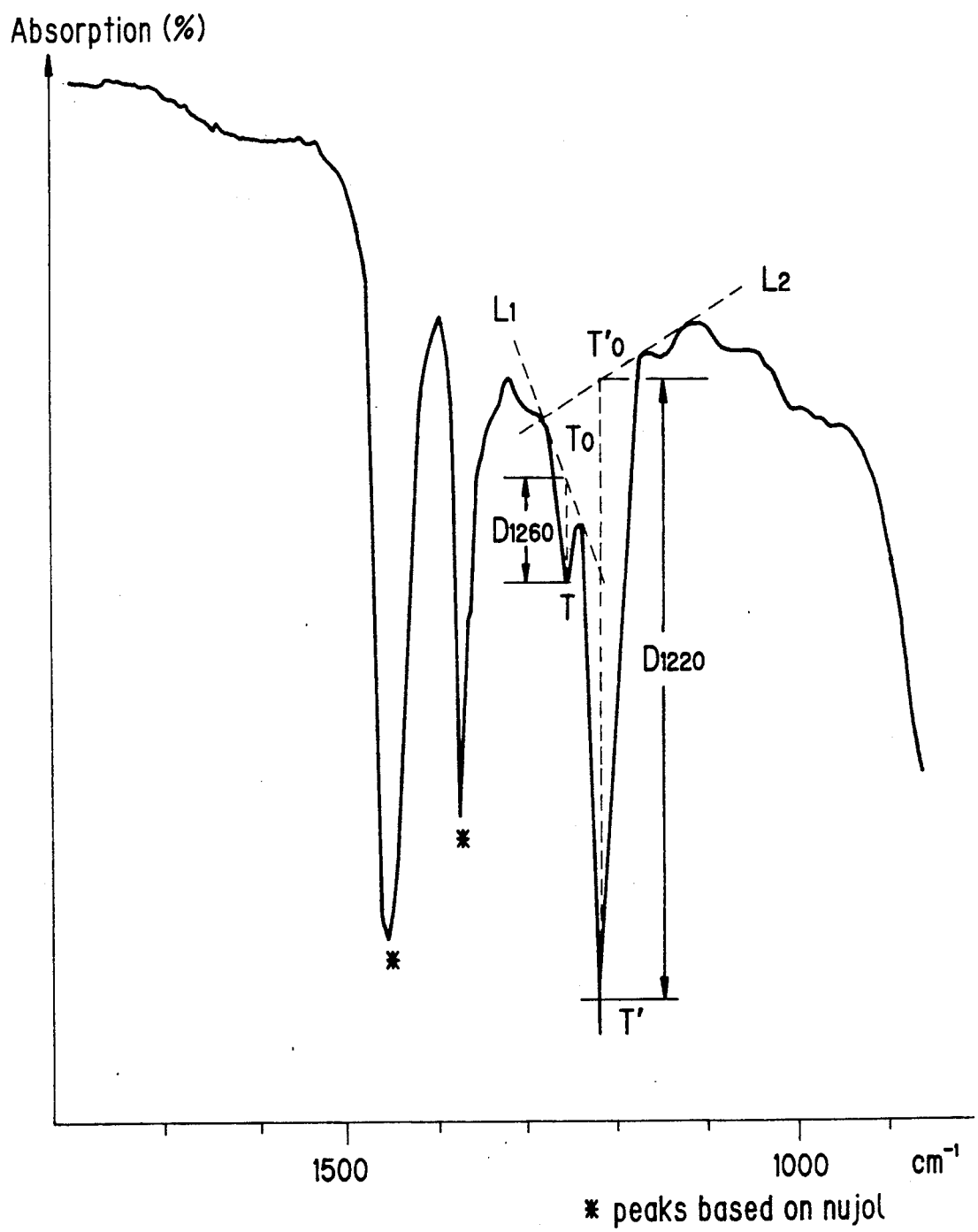
FIG. 1 is a graph showing IR spectrum of the benzene-insoluble organoaluminum oxy-compound used in the present invention.

The olefin polymerization catalyst components, olefin polymerization catalyst and the process for the polymerization of olefins using said olefin polymerization catalysts are illustrated below in detail.

In the present invention, the term "polymerization" is sometimes used in a sense that it includes not only homopolymerization but also copolymerization, and also the term "polymer" is sometimes used in a sense that it includes not only homopolymer but also copolymer.

The olefin polymerization catalyst components of the present invention comprises a benzene-insoluble organoaluminum oxy-compound [A].

Benzene-insoluble organoaluminum oxy-compound [A]

The benzene-insoluble organoaluminum oxy-compounds [A] used in the present invention have less than 10%, preferably less than 5% and, in particular, less than 2% in terms of Al atom of Al component dissolving in benzene kept at 60° C. and are insoluble or sparingly soluble in benzene. Namely, Al component of the organoaluminum oxy-compound [A] dissolving in benzene kept at 60° C. is less than 10%, preferably less than 5% and, in particular, less than 2% in terms of Al atom.

Solubility in benzene of such organoaluminum oxy-compounds as mentioned above is obtained by suspending in 100 ml of benzene said organoaluminum oxy-compound in an amount corresponding to 100 mg atoms in terms of Al atom, mixing the resulting suspension at 60° C. for 6 hours, filtering the resulting mixture with G-5 glass filter equipped with a jacket kept at 60° C., and washing four times the solids portion separated on the filter with 50 ml of benzene at 60° C. to measure the amount (x mmol) of Al atoms present in the whole filtrate.

When the benzene-insoluble organoaluminum oxy-compounds of the present invention are analyzed by infrared spectrophotometry (IR), a ratio ($D_{1260}/D_{1220}$) of an absorbance ($D_{1260}$) at around 1260 cm$^{-1}$ to an absorbance ($D_{1220}$) at around 1220 cm$^{-1}$ is less than 0.09, preferably less than 0.08 and particularly in the range of from 0.04 to 0.07.

Infrared spectrophotometric analysis of the organoaluminum oxy-compounds as referred to in the present specification is carried out in the following manner.

First, the organoaluminum oxy-compound is ground, together with nujol, in an agate mortar in a nitrogen box to paste.

Next, the paste-like sample thus obtained is but between KBr plates, and IR spectrum is measured in a nitrogen atmosphere by means of IR-810 manufactured and sold by Nippon Bunko K.K.

IR spectrum of the organoaluminum oxy-compound of the present invention as obtained is shown in FIG. 1.

From the thus obtained IR spectrum, a $D_{1260}D_{1220}$ ratio is sought, and a value of said ratio is obtained in the following manner.

(a) A line connecting a maximum point at around 1280 cm$^{-1}$ and a maximum point at around 1240 cm$^{-1}$ is taken as a base line $L_1$.

(b) A transmittance (T %) of an absorption minimum point at around 1260 cm$^{-1}$ and an transmittance ($T_0$ %) of a point of intersection are read, said point of intersection being obtained by drawing a vertical line from said absorption minimum point to a wave number abscissa axis (abscissa) and crossing said vertical line with said base line $L_1$, whereby an absorbance ($D_{1260}=\log T_0/T$) is calculated.

(c) Similarly, a line connecting maximum points at around 1280 cm$^{-1}$ and at around 1180 cm$^{-1}$ is taken as a base line $L_2$.

(d) A transmittance (T' %) of an absorption minimum point at around 1220 cm$^{-1}$ and a transmittance ($T'_0$ %) of a point of intersection are read, said point of intersection being obtained by drawing a vertical line from said absorption minimum point to a wave number abscissa axis (abscissa) and crossing said vertical line with said base line $L_2$, whereby an absorbance $D_{1220}=\log T'_0/T'$) is calculated.

(e) From these values as obtained, $D_{1260}/D_{1220}$ is calculated.

IR spectrum of a known benzene-soluble organoaluminum oxy-compound is shown in FIG. 2. As can be seen from FIG. 2, the benzene-soluble aluminum oxy-compound has a value of $D_{1260}/D_{1220}$ of being virtually 0.10–0.13, and thus benzene-insoluble organoaluminum oxy-compound of the present invention is apparently different in the value of $D_{1260}D_{1220}$ from the known benzene-soluble organoaluminum oxy-compound.

The benzene-insoluble organoaluminum oxy-compounds of the present invention are presumed to have an alkyloxyaluminum unit represented by the formula

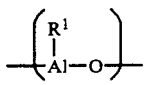

wherein $R^1$ is a hydrocarbon group of 1 to 12 carbon atoms.

In the above-mentioned alkyloxyaluminum unit, $R^1$ includes, for example, methyl, ethyl, n-propyl, isopropyl, n-butyl, isobutyl, pentyl, hexyl, octyl, decyl, cyclohexyl and cyclooctyl. Of these hydrocarbon groups exemplified above, preferred are methyl and ethyl, and particularly preferred is methyl.

In addition to the alkyloxyaluminum unit of the formula,

the benzene-insoluble organoaluminum oxy-compounds of the present invention may contain an oxyaluminum unit represented by the formula

wherein $R^1$ is as defined above, and $R^2$ is a hydrocarbon group of 1 to 12 carbon atoms, an alkoxyl group of 1 to 12 carbon atoms, an aryloxy group of 6 to 20 carbon atoms, a hydroxyl group, halogen or hydrogen, provided that $R^1$ and $R^2$ are different from each other. In that case, the organoaluminum oxy-compounds desirably contain the alkyloxyaluminum unit

in a proportion of at least 30 mol%, preferably at least 50 mol% and particularly at least 70 mol%.

The processes for preparing the benzene-insoluble organoaluminum oxy-compounds [A] as mentioned above are illustrated below in detail.

The above-mentioned benzene-insoluble organoaluminum oxy-compounds [A] are obtained by bringing a solution of aluminoxane into contact with water or an active hydrogen containing compound.

The solution of aluminoxane used in the present invention may be prepared, for example, by the following procedures.

(1) The procedure for recovering aluminoxanes as their solution in hydrocarbons which comprises reacting organoaluminum compounds such as trialkylaluminum with suspensions in hydrocarbon solvents of compounds having absorbed water or salts containing water of crystallization, for example, hydrates of magnesium chloride, copper sulfate, aluminum sulfate, nickel sulfate or cerous chloride.

(2) The procedure for recovering aluminoxanes as their solution in hydrocarbons which comprises allowing organoaluminum compounds such as trialkylaluminum to interact directly with water, ice or water vapor in solvents such as benzene, toluene, ethyl ether and tetrahydrofuran.

In this connection, aluminoxane of the above-mentioned solution of aluminoxane may contain small amount of organometallic components. Furthermore, the solution of aluminoxane recovered by the above-mentioned procedures may be distilled to remove therefrom the solvent or unreacted organoaluminum compound, followed by dissolving again in solvents.

The organoaluminum compounds used for preparing such solutions of aluminoxane as mentioned above include, for example, trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylalunimum, tridecylaluminum, tricyclohexylaluminum, tricyclooctylaluminum; dialkylaluminum halides such as dimethylaluminum chloride, diethylaluminum chloride, diethylaluminum bromide and diisobutylaluminum chloride; dialkylaluminum hydrides such as diethylaluminum hydride and diisobutylaluminum hydride; dialkylaluminum alkoxides such as dimethylaluminum methoxide and diethylaluminum ethoxide; and dialkylaluminum aryloxides such as diethylaluminum phenoxide.

Of the organoaluminum compounds as exemplified above, particularly preferred is trialkylaluminum.

Furthermore, there may also be used as the organoaluminum compound isoprenylaluminum represented by the general formula $$(i\text{-}C_4H_9)_xAl_y(C_5H_{10})_z$$

wherein x, y and z are each a positive number, and $z \geq 2x$.

The organoaluminum compounds mentioned above may be used either singly or in combination.

Solvents used in the solutions of aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; or haloganated hydrocarbons such as halides, particularly chloride and bromides, of the above-mentioned aromatic, aliphatic and alicyclic hydrocarbons. In addition thereto, there may also be used ethers such as ethyl ether and tetrahydrofuran. Of these solvents as exemplified above, particularly preferred are aromatic hydrocarbons.

In the present invention, as mentioned above, the benzene-insoluble organoaluminum oxy-compounds [A] are obtained by bringing the above-mentioned solution of aluminoxane into contact with water or an active hydrogen containing compound.

The active hydrogen containing compounds used in the present invention include alcohols such as methanol, ethanol, n-propanol and isopropanol; diols such as ethylene glycol and hydroquinone; and organic acids such as acetic acid and propionic acid. Of thee compounds, preferred are alcohols and diols, and especially preferred alcohols.

Water or the active hydrogen containing compounds with which the solution of aluminoxane is brought into contact may be used as solutions or dispersions in hydrocarbon solvents such as benzene, toluene and hexane, either solvents such as tetrahydrofuran or amine solvents such as triethylamine, or may be used in the form of vapor or solid. The water with which the solution of aluminoxane is brought into contact may be water of crystallization of salts such as magnesium chloride, magnesium sulfate, aluminum sulfate, copper sulfate, nickel sulfate, iron sulfate and cerous chloride, or absorbed water absorbed to inorganic compounds such as silica, alumina and aluminum hydroxide or polymers.

Reaction of the solution of aluminoxane with water or the active hydrogen containing compounds is carried out usually in solvents, for example, hydrocarbon solvents. The solvents used in this case are aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cycohexane, cyclooctane and methylcyclohexane; petroleum fractions such as gasoline, kerosene and gas oil; halogenated hydrocarbons such as halides of the above-mentioned aromatic hydrocarbons, aliphatic hydrocarbons and alicyclic hydrocarbons, particularly, chlorides and bromides; and ethers such as ethyl ether and tetrahydrofuran. Of these solvents as exemplified above, particularly preferred are aromatic hydrocarbons.

In the reaction as mentioned above, water or the active hydrogen containing compound is used in an amount of 0.1–5 moles, preferably 0.2–3 moles to 1 mole of Al atoms present in the solution of aluminoxane. A concentration in terms of aluminum atom in the reaction system is desirably $1 \times 10^{-3}$–5 gram atom/l, preferably $1 \times 10^{-2}$–3 gram atom/l, and a concentration of water in the reaction system is desirably $2 \times 10^{-4}$–5 mol/l, preferably $2 \times 10^{-3}$–3 mol/l.

The solution of aluminoxane may be brought into contact with water or the active hydrogen containing compound, for example, by the following procedures.

(1) The procedure which comprises bringing the solution of aluminoxane into contact with a hydrocarbon solvent containing water or the active hydrogen containing compound.

(2) The procedure which comprises blowing vapor of water or the active hydrogen containing compound into the solution of aluminoxane, thereby bringing the aluminoxane into contact with the vapor.

(3) The procedure which comprises bringing the solution of aluminoxane into contact directly with water, ice or the active hydrogen containing compound.

(4) The procedure which comprises mixing the solution of aluminoxane with a suspension of an absorbed water containing compound or a water of crystallization containing compound in hydrocarbon, or with a suspension of a compound, to which the active hydrogen containing compound has been absorbed, in hydrocarbon, thereby bringing the aluminoxane into contact with the absorbed water or water of crystallization or the active hydrogen containing compound.

The solution of aluminoxane may contain other components so long as they do not exert adverse effects on the reaction of aluminoxane with water or the active hydrogen containing compound.

The above-mentioned reaction of the solution of aluminoxane with water or the active hydrogen containing compound is carried out usually at $-50°$ to $150°$ C., preferably $0°–120°$ C. and more desirably at $20°–100°$ C. The reaction time employed is usually 0.5–300 hours, preferably 1–150 hours, though said reaction time varies largely depending upon the reaction temperature used.

The benzene-insoluble organoaluminum oxy-compounds [A] used in the present invention may also be obtained directly by bringing the above-mentioned organoaluminum into contact with water. In this case, the water is used in such an amount that the organoaluminum atoms dissolved in the reaction system become less than 20% based on the total organoaluminum atoms.

The water which is brought into contact with the organoaluminum compound may be used after dissolving or dispersing it in hydrocarbon solvents such as benzene, toluene and hexane, ether solvents such as tetrahydrofuran or amine solvents such as triethylamine, or may be used in the form of water vapor or ice. Furthermore, as the water, there may also be used water of crystallization of salts such as magnesium chloride, magnesium sulfate, aluminum sulfate, copper sulfate, nickel sulfate, iron sulfate and cerous chloride, or absorbed water absorbed to inorganic compounds such as silica, alumina and aluminum hydroxide or polymers.

The reaction of the organoaluminum compound with water is carried out usually in hydrocarbon solvents. In this case, the hydrocarbon solvents used include aromatic hydrocarbons such as benzene, toluene, xylene, cumene and cymene, aliphatic hydrocarbons such as butane, isobutane, pentane, hexane, heptane, octane, decane, dodecane, hexadecane and octadecane, alicyclic hydrocarbons such as cyclopentane, cyclohexane, cyclooctane, cyclodecane, cyclododecane and methylcyclohexane, petroleum fractions such as gasoline, kerosene or gas oil, or halides, particularly chlorides and bromides, of the above-mentioned aromatic, aliphatic and alicyclic hydrocarbons. In addition thereto, there may also be used ethers such as ethyl ether and tetrahydrofuran. Of these solvents as exemplified above, particularly preferred are aromatic hydrocarbons.

Desirably, a concentration in terms of aluminum atom of the organoaluminum compound in the reaction system is usually $1 \times 10^{-3}$–20 mol/l, preferably $1 \times 10^{-3}$–10 mol/l, further preferably $1 \times 10^{-3}$–5 gram atom/l, and $1 \times 10^{-2}$–3 gram atom/l in particular, and a concentration of water in the reaction system is usually $1 \times 10^{-3}$–5 mol/l and preferably $1 \times 10^{-2}$–3 mol/l. In this case, the aluminum atoms dissolved in the reaction system is desirably less than 20%, preferably less than 10% and further preferably 0–5% based on the total organoaluminum atoms.

The organoaluminum compound may be brought into contact with water, for example, by the following procedures.

(1) The procedure which comprises bringing a hydrocarbon solution of organoaluminum into contact with a hydrocarbon solution containing water.

(2) The procedure which comprises blowing water vapor into a hydrocarbon solution of organoaluminum, thereby bringing the organoaluminum to contact with water.

(3) The procedure which comprises mixing a hydrocarbon solution of organoaluminum with a hydrocarbon suspension of an absorbed water containing compound or a water of crystallization containing compound, thereby bringing the organoaluminum into contact with the absorbed water or water of crystallization.

(4) The procedure which comprises bringing a hydrocarbon solution of organoaluminum into contact with ice.

The above-mentioned hydrocarbon solution of organoaluminum may contain other components so long as they do not exert adverse effects on the reaction of the organoaluminum with water.

The reaction of the organoaluminum compound with water is carried out usually at a temperature of $-100°\text{-}150°$ C., preferably $-70°\text{-}100°$ C. and further preferably $-50°\text{-}80°$ C. The reaction time, though it varies largely depending upon the reaction temperature employed, is usually 1–200 hours, preferably 2–100 hours.

The olefin polymerization catalysts of the present invention are illustrated hereinafter.

The first olefin polymerization catalyst of the present invention comprises the above-mentioned organoaluminum oxy-compound [A] having less than 10% in terms of Al atom of Al component dissolving in benzene kept at 60° C., and a transition metal compound [B] containing a ligand having a cycloalkadienyl skeleton.

The transition metal compound [B] as mentioned above is illustrated below in detail.

Transition metal compound [B]

The transition metal compound [B] used in the present invention is represented by the formula $ML_x$ wherein M is a transition metal, L is a ligand coordinating to the transition metal, at least one of L is a ligand having a cycloalkadienyl skeleton, L other than the ligand having a cycloalkadienyl skeleton is a hydrocarbon group of 1-12 carbon atoms, an alkoxy group, an aryloxy group, halogen or hydrogen, and x is a valence of the transition metal.

In the above-mentioned formula, M which is a transition metal includes zirconium titanium, hafnium, chromium or vanadium by preference, and particularly preferred are zirconium and hafnium.

The ligands having a cycloalkadienyl skeleton include, for example, cyclopentadienyl, alkyl-substituted cyclopentadienyl groups such as methylcyclopentadienyl, ethylcyclopentadienyl, n-butylcyclopentadienyl, dimethylcyclopentadienyl and pentamethylcyclopentadienyl, and an indenyl group, 4,5,6,7-tetrahydroindenyl group and a fluorenyl group.

Two or more ligands having a cycloalkadienyl skeleton as mentioned above may coordinate to the transition metal and, in this case, at least two ligands having a cycloalkadienyl skeleton may be bonded together via a lower alkylene group.

The ligand other than those having a cycloalkadienyl skeleton is a hydrocarbon group of 1-12 carbon atoms, an alkoxy group, an aryloxy group, halogen or hydrogen.

The hydrocarbon group having 1-12 carbon atoms mentioned above includes, for example, alkyl, cycloalkyl, aryl and aralkyl, and the alkyl group includes methyl, ethyl, propyl, isopropyl and butyl.

The cycloalkyl group mentioned above includes, for example, cyclopentyl and cyclohexyl, the aryl group includes, for example, phenyl and tolyl, and the aralkyl group includes, for example, benzyl and neophyl.

The alkoxy group mentioned above includes, for example, methoxy, ethoxy and butoxy, and the aryloxy group includes, for example, phenoxy.

The halogen mentioned above includes, for example, fluorine, chlorine, bromine and iodine.

Such transition metal compounds [B] containing ligands having a cycloalkadienyl skeleton as used in the present invention, for example, the transition metal thereof has a valence of 4, may be represented more concretely by the formula

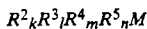

wherein M is zirconium, titanium, hafnium or vanadium, $R^2$ is a group having a cycloalkadienyl skeleton, $R^3$, $R^4$ and $R^5$ are each a group having a cycloalkadienyl skeleton, an alkyl, cycloalkyl, aryl, aralkyl, alkoxy or aryloxy group, halogen or hydrogen, k is an integer of at least 1, and $k+l+m+n=4$.

Transition metal compounds are those of the above-mentioned formula $R^2_k R^3_l R^4_m R^5_n M$ in which at least two of $R^2$, $R^3$, $R^4$ and $R^5$, that is, $R^2$ and $R^3$ are each a group having a cycloalkadienyl skeleton, said two groups having a cycloalkadienyl skeleton may be bonded to each other via lower alkylene, for example, methylene, ethylene, propylene or the like, and $R^4$ and $R^5$ may be each a group having a cycloalkadienyl skeleton, an alkyl, cycloalkyl, aryl, aralkyl, alkoxy or aryloxy group, halogen or hydrogen.

Listed below are typical representatives of the transition metal compounds [B] having a cycloalkadienyl skeleton, represented by the aforementioned formula $ML_x$ in which M is zirconium.

Bis(cyclopentadienyl)zirconium monochloride monohydride,
Bis(cyclopentadienyl)zirconium monobromide monohydride,
Bis(cyclopentadienyl)methyl zirconium hydride,
Bis(cyclopentadienyl)ethyl zirconium hydride,
Bis(cyclopentadienyl)phenyl zirconium hydride,
Bis(cyclopentadienyl)benzyl zirconium hydride,
Bis(cyclopentadienyl)neopentyl zirconium hydride,
Bis(methylcyclopentadienyl)zirconium monochloride hydride,
Bis(indenyl)zirconium monochloride monohydride,
Bis(cyclopentadienyl)zirconium dichloride,
Bis(cyclopentadienyl)zirconium dibromide,
Bis(cyclopentadienyl)methyl zirconium monochloride,
Bis(cyclopentadienyl)ethyl zirconium monochloride
Bis(cyclopentadienyl)cyclohexyl zirconium monochloride,
Bis(cyclopentadienyl)phenyl zirconium monochloride,
Bis(cyclopentadienyl)benzyl zirconium monochloride,
Bis(methylcyclopentadienyl)zirconium dichloride,
Bis(n-butylcyclopentadienyl)zirconium dichloride,
Bis(indenyl)zirconium dichloride,
Bis(indenyl)zirconium dibromide,
Bis(cyclopentadienyl)zirconium dimethyl,
Bis(cyclopentadienyl)zirconium diphenyl,
Bis(cyclopentadienyl)zirconium dibenzyl,
Bis(cyclopentadienyl)zirconium methoxychloride,
Bis(cyclopentadienyl)zirconium ethoxychloride,
Bis(methylcyclopentadienyl)zirconium ethoxychloride,
Bis(cyclopentadienyl)zirconium phenoxychloride,
Bis(fluorenyl)zirconium dichloride, Listed below are typical representatives of the transition metal compounds [B] of the above-mentioned formula in which M is zirconium and which contain at least two ligands having a cycloalkadienyl skeleton, said ligands being bonded together via lower alkylene groups.

Ethylenebis(indenyl)dimethyl zirconium,
Ethylenebis(indenyl)diethyl zirconium,
Ethylenebis(indenyl)diphenyl zirconium,
Ethylenebis(indenyl)methyl zirconium monochloride,
Ethylenebis(indenyl)ethyl zirconium monochloride,
Ethylenebis(indenyl)methyl zirconium monobromide,
Ethylenebis(indenyl)zirconium dichloride,
Ethylenebis(indenyl)zirconium dibromide,
Ethylenebis(indenyl)zirconium methoxy monochloride,
Ethylenebis(indenyl)zirconium ethoxy monochloride,
Ethylenebis(indenyl)zirconium phenoxy monochloride,
Ethylenebis(cyclopentadienyl)zirconium dichloride,
Propylenebis(cyclopentadienyl)zirconium dichloride,
Ethylenebis(t-butylcyclopentadienyl)zirconium dichloride,
Ethylenebis(4,5,6,7-tetrahydro-1-indenyl)dimethyl zirconium,
Ethylenebis(4,5,6,7-tetrahydro-1-indenyl)methyl zirconium monochloride,
Ethylenebis(4,5,6,7-tetrahydro-1-indenyl)zirconium dichloride,
Ethylenebis(4,5,6,7-tetrahydro-1-indenyl)zirconium dibromide,
Ethylenebis(4-methyl-1-indenyl)zirconium dichloride,
Ethylenebis(5-methyl-1-indenyl)zirconium dichloride,
Ethylenebis(6-methyl-1-indenyl)zirconium dichloride,
Ethylenebis(7-methyl-1-indenyl)zirconium dichloride,
Ethylenebis(5-methoxy-1-indenyl)zirconium dichloride,
ethylenebis(2,3-dimethyl-1-indenyl)zirconium dichloride,
Ethylenebis(4,7-dimethyl-1-indenyl)zirconium dichloride,
Ethylenebis(4,7-dimethoxy-1-indenyl)zirconium dichloride.

There may also be used transition metal compounds obtained by replacing the zirconium metal in the above-exemplified zirconium compounds with titanium metal, hafnium metal, or vanadium metal.

These transition metal compounds may also be used in admixture of two or more.

In the present invention, polymers which ar particularly high in stereoregularity are obtained when such ethylenebisindenyl type zirconium or hafnium compounds are used as the transition metal compounds [B] containing at least two ligands having a cycloalkadienyl skeleton, said ligands being bonded together via lower alkylene groups.

The second olefin polymerization catalyst of the present invention is illustrated below.

This olefin polymerization catalyst comprises the above-mentioned organoaluminum oxy-compound [A] having less than 10% in terms of Al atom of Al component dissolving in benzene kept at 60° C., the above-mentioned transition metal compound [B] containing a ligand having a cycloalkadienyl skeleton, and an organoaluminum compound [C].

The organoaluminum compound [C] is illustrated below in detail.

Organoaluminum compound [C]

The organoaluminum compound [C] used in the present invention is represented by the formula $R^6_m AlX_{3-m}$ wherein $R^6$ is hydrocarbon of 1-12 carbon atoms, X is halogen and m is 1-3, or the formula $R^6_n AlY_{3-n}$ wherein $R^6$ is as defined above, Y is hydrogen, $-OR^7$, $-OSiR^8_3$, $-OAlR^9_2$,

$-NR^{12}_2$ or $SiR^{13}_3$, n is 1-2 and $R^7$ through $R^{13}$ are each hydrogen, halogen or hydrocarbon.

In the above-mentioned formula, $R^6$ is hydrocarbon of 1-12 carbon atoms, for example, alkyl, cycloalkyl or aryl, including concretely methyl, ethyl, n-propyl, isopropyl, isobutyl, pentyl, hexyl, octyl, decyl, cyclopentyl, cyclohexyl, phenyl, otlyl, etc.

The organoaluminum compounds of the formula $R^6_m AlX_{3-m}$ include, in concrete, such compounds as mentioned below.

Trialkylaluminum such as trimethylaluminum, triethylaluminum, triisopropylaluminum, triisobutylaluminum, trihexylaluminum, trioctylaluminum, tri-2-ethylhexylaluminum, etc.

Alkenylaluminum such as isporenylaluminum, etc.

Dialkylaluminum halides such as dimethylaluminum chloride, diethylaluminum chloride, diisopropylaluminum chloride, diisobutylaluminum chloride, diisobutylaluminum bromide, etc.

Alkylaluminum sesquihalides such as methylaluminum sesquichloride, ethylaluminum sesquichloride, isopropylaluminum sesquichloride, isobutylaluminum sesquichloride, ethylaluminum sesquibromide, etc.

Alkylaluminum dihalides such as methylaluminum dichloride, ethylaluminum dichloride, isopropylaluminum dichloride, isobutylaluminum dichloride, ethylaluminum dibromide, etc.

The organoaluminum compounds of the formula $R^6_n AlY_{3-n}$ include, in concrete, such compounds as enumerated below.

(i) Compounds of the formula $R^6_n Al(OR^7)_{3-n}$ such as dimethylaluminum methoxide, diethylaluminum ethoxide, diisobutylaluminum butoxide, diisobutylaluminum methoxide, etc. (p1 (ii) Compounds of the formula $R^6_n Al(OSiR^8_3)_{3-n}$ such as $(C_2H_5)_2AlOSi(CH_3)_3$, (iso-$C_4H_9)_2AlOSi(CH_3)_3$, (iso-$C_4H_9)_2AlOSi(C_2H_5)_3$, etc.

(iii) Compounds of the formula $R^6_n Al(OAlR^9_2)_{3-n}$ such as $(C_2H_5)_2AlOAl(C_2H_5)_2$, (iso-$C_4H_9)_2AlOAl$(iso-$C_4H_9)_2$, etc.

(iv) Compounds of the formula

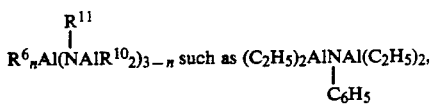

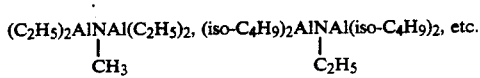

(v) Compounds of the formula $R^6_n Al(NR^{12}_2)_{3-n}$ such as $(CH_3)_2AlN(C_2H_5)_2$, $(C_2H_5)_2AlNHCH_3$, $(CH_3)_2AlNH(C_2H_5)$, $(C_2H_5)_2AlN(Si(CH_3)_3)_2$, (iso-$C_4H_9)_2AlN(Si(CH_3)_3)_2$,etc.

(vi) Compounds of the formula $R^6_n Al(SiR^{13}_3)_{3-n}$ such as (iso-$C_4H_9)_2AlSi(CH_3)_3$, etc.

Of the organoaluminum compounds as exemplified above, preferred are those of the formula $R^6_3Al$, $R^6_2Al(OR^7)$ or $R^6_2Al(OAlR^9_2)$, and particularly preferred are those of the formula $R^6_3Al$, $R^6_2Al(OR^7)$ or $R^6_2Al(OAlR^9_2)$ in which $R^6$ is a branched chain alkyl group. Concretely, particularly preferred are triisoalkylaluminum compounds such as triisobutylaluminum, tri-2-ethylhexylaluminum and the like.

These organoaluminum compounds may be used alone or in combination.

The third olefin polymerization catalyst of the present invention is illustrated below.

This olefin polymerization catalyst comprises the above-mentioned organoaluminum oxy-compound [A] having less than 10% in terms of Al atoms of Al component dissolving in benzene kept at 60° C., the above-mentioned transition metal compound [B] containing a ligand having a cycloalkadienyl skeleton, and an aluminoxane [D] having at least one hydrocarbon group other than n-alkyl group bonded to the aluminum atom.

This aluminoxane [D] is illustrated below in detail.

Aluminoxane [D] having at least one hydrocarbon group other than n-alkyl bonded to the aluminum atom The aluminoxane used in the present invention has at least one hydrocarbon group other than n-alkyl group bonded to the aluminum atom.

Such aluminoxane as mentioned above may be prepared for example, by the following procedures.

(1) A method which comprises reacting a suspension of a compound containing water of absorption or a salt containing water of crystallization, for example, magnesium chloride hydrate, copper sulfate hydrate, aluminum sulfate hydrate, nickel sulfate hydrate or cerous chloride hydrate, in a hydrocarbon medium with an organoaluminum compound having at least one hydrocarbon group other than n-alkyl group bonded to the aluminum atom such as trialkylaluminum.

(2) A method which comprises reacting an organoaluminum compound having at least one hydrocarbon group other than n-alkyl group bonded to the aluminum atom such as trialkylaluminum directly with water, ice or water vapor in a medium such as benzene, toluene, ethyl ether or tetrahydrofuran.

The aluminoxane prepared by these methods may contain small amounts of organometallic components. The above-mentioned solution of aluminoxane recovered may be distilled to remove the solvent or unreacted organoaluminum compound therefrom, followed by dissolving again in a solvent.

The organoaluminum compounds used in the preparation of the aluminoxane having at least one hydrocarbon group other than n-alkyl group bonded to the aluminum atom contain at least one hydrocarbon group other than n-alkyl group. The hydrocarbon group other than n-alkyl group includes, for example, branched chain alkyl such as isoalkyl, cycloalkyl and aryl.

Typical representatives of such organoaluminum compounds as mentioned above include, in concrete, trialkylaluminum such as triisopropylaluminum, triisobutylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum; tricycloalkylaluminum such as tricyclohexylaluminum; and triarylaluminum such as triphenylaluminum, tritolylaluminum; dialkylaluminum hydride such as diisobutylaluminum hydride; alkylaluminum alkoxide such as isobutylaluminum methoxide, isobutylaluminum ethoxide, isobutylaluminum isopropoxide. Of the organoaluminum compounds exemplified above, preferred are trialkylaminum compounds having a branched alkyl, and particularly preferred are triisobutylaluminum compounds.

The above-mentioned aluminoxane having at least one hydrocarbon group other than n-alkyl group bonded to the aluminum atom has a solubility in benzene kept at 23° C. of at least 1 gram atom-Al/l, and is soluble in benzene.

The fourth olefin polymerization catalyst of the present invention is illustrated below.

This olefin polymerization catalyst comprises the above-mentioned organoaluminum oxy-compound [A] having less than 10% in terms of Al atom of Al component dissolving in benzene kept at 60° C., the above mentioned transition metal compound [B] containing a ligand having a cycloalkadienyl skeleton, the above-mentioned organoaluminum compound [C], and an aluminoxane [D] having at least one hydrocarbon group other than n-alkyl group bonded to the aluminum atom.

Polymerization of olefins

In the present invention, polymers are prepared by polymerizing or copolymerizing α-olefins with olefin polymerization catalysts as mentioned above.

Olefins which can be polymerized by the use of the olefin polymerization catalysts of the present invention include ethylene and α-olefins of 3 to 20 carbon atoms, for example, propylene, 1-butene, 1-hexene, 4methyl-1-pentene, 1octene, 1-decene, 1-dodecene, 1-pentene, 1tetradecene, 1-hexadecene, 1-octadecene, 1-eicocene, cyclopentene, cycloheptene, norbornene, 5methyl-2-norbornene, tetracyclododecene, and 2-methyl-1,4,5,8-dimethano-1,2,3,4,4a,5,8,8a-octahydronaphthalene.

Furthermore, there may be also used styrene, vinylcyclohexane and diene.

In the present invention, polymerization may be carried out by liquid phase polymerization such as solution polymerization and suspension polymerization, or by gas phase polymerization.

A temperature at which olefin is polymerized with such olefin polymerization catalysts as mentioned above is usually from $-50°$ to 200° C., preferably from 0° to 150° C. The polymerization is carried out usually at a pressure in the range of from ordinary pressure to 100 kg/cm$^2$, preferably from ordinary pressure to 50 kg/cm$^2$, and the polymerization reaction may be carried out by batch method, semi-continuous method or continuous method. The polymerization can also be carried out under different reaction conditions, dividing into two or more stages. A molecular weight of the resulting olefin polymers may be regulated by making hydrogen present in the polymerization system or by varying the polymerization temperature.

In the practice of polymerization of olefins with the above-mentioned first polymerization catalyst of the present invention as mentioned above, it is desirable to use the benzene-insoluble organoaluminum oxy-compound [A] in an amount of usually $10^{-6}$–0.1 gram atom-Al/l, preferably $10^{-5}$–$10^{-2}$ gram Al/l, and the transition metal compound [B] containing a ligand having a cycloalkadienyl skeleton in an amount of usually $10^{-8}$–$10^{-3}$ mol/l, preferably $10^{-7}$–$10^{-4}$ mol/l.

Similarly, in the case of the second olefin polymerization catalyst of the invention, the benzene-insoluble organoaluminum oxy-compound [A] is used in an amount of usually $10^{-6}$–0.1 gram atom-Al/l, preferably $10^{-5}$–$10^{-2}$ gram atom-Al/l, the transition metal compound [B] containing a ligand having a cycloalkadienyl skeleton in an amount of usually $10^{-8}$–$10^{-3}$ mol/l, preferably $10^{-7}$–$10^{-4}$ mol/l, and the organoaluminum compound [C] in an amount of usually of $10^{-5}$–0.1 mol/l, preferably $10^{-4}$–$10^{-2}$ mol/l. Furthermore, a ratio (in terms of Al atom) of the benzene-insoluble organoaluminum oxy-compound [A] to the organoaluminum compound [C] is desirably in the range of from 0.01 to 5, preferably from 0.02 to 2.

In the case of the third olefin polymerization catalyst of the invention, similarly, the benzene-insoluble organoaluminum oxy-compound [A] is used in an amount of usually $10^{-6}$–0.1 gram atom-Al/l, preferably $10^{-5}$–$10^{-2}$ gram atom-Al/l, the transition metal compound [B] containing a ligand having a cycloalkadienyl skeleton in an amount of usually $10^{-8}$–$10^{-3}$ mol/l, preferably $10^{-7}$–$10^{-4}$ mol/l, and the above-mentioned alumnoxane [D] in an amount of usually $10^{-5}$–0.1 gram atom-Al/l, preferably $10^{-4}$–$10^{-2}$ gram atom-Al/l. Furthermore, a ratio (in terms of Al atom) of he benzene-insoluble organoaluminum oxy-compound [A] to the aluminoxane [D] is desirably in the range of from 0.01 to 5, preferably from 0.02 to 2.

Further, in the case of the fourth olefin polymerization catalyst of the invention, similarly, the benzene-insoluble organoaluminum oxy-compound [A] is used in an amount of usually $10^{-6}$–0.1 gram atom-Al/l, preferably $10^{-5}$–$10^{-2}$ gram atom-Al/l, the transition metal compound [B] containing a ligand having a cycloalkadienyl skeleton in an amount of usually $10^{-8}$–$10^{31\ 3}$ mol/l, preferably $10^{-7}$–$10^{-4}$ mol/l, and the organoaluminum compound [C] in an amount of usually $10^{-5}$–0.1 mol/l, preferably $10^{-4}$–$10^{-2}$ mol/l. Further, the aluminoxane [D] is desirably used in an amount of usually $10^{-5}$–0.1 gram atom-Al/l, preferably $10^{-4}$–$10^{-2}$ gram atom-Al/l. Furthermore, a ratio (in terms of Al atom) of the benzene-insoluble organoaluminum oxy-compound [A] to the organoaluminum compound [C] is desirably in the range of from 0.01 to 5, preferably from 0.02 to 2, and a ratio (in terms of Al atom) of the benzene-insoluble organoaluminum oxy-compound [A] to the aluminoxane [D] is in the range of from 0.01 to 5, preferably from 0.02 to 2.

The olefin polymerization catalysts of the present invention have excellent polymerization activities. That is, the olefin polymerization catalysts of the invention are capable of giving olefin polymers per unit weight of the organoaluminum oxy-compound about 1.2–20 times the amount of the polymer obtained by the use of known olefin polymerization catalysts composed of benzene-soluble aluminoxane and metallocene compounds. Further, the olefin polymerization catalysts of the invention can give polymers having a high molecular weight in comparison with those obtained with the known olefin polymerization catalysts composed of benzene-soluble aluminoxane and metallocene compounds.

Furthermore, olefin (co)polymers having a narrow molecular weight distribution and a narrow composition distribution may be obtained by copolymerizing olefins with the olefin polymerization catalysts of the invention.

In the present invention, moreover, the olefin polymerization catalysts may contain also components useful for olefin polymerization in addition to such components as mentioned hereinbefore.

The present invention is illustrated below with reference to examples, but it should be construed that the invention is in no way limited to those examples.

EXAMPLE 1

Preparation of aluminoxane

A 400 ml flask thoroughly purged with nitrogen was charged with 37 g of $Al_2(SO_4)_3 \cdot 14H_2O$ and 125 ml of toluene, cooled to 0° C., and 500 mmoles of trimethylaluminum diluted with 125 ml of toluene was added dropwise. The temperature of the flask was elevated to 40° C., and the reaction was continued at that temperature for 10 hours. After the completion of the reaction, the reaction mixture was subjected to solid-liquid separation by filtration, and the toluene was removed from the filtrate, whereby 12 g of white solid aluminoxane was obtained. [Preparation of benzene-insoluble organoaluminum oxy-compound]

A 400 ml glass flask thoroughly purged with nitrogen was charged with 59.7 ml of toluene, 40.3 ml of a solution of aluminoxane in toluene (Al 2.48 moles-Al/l) and 25 g of Teflon column ($\phi$2 mm $\times$ 1.2 mm) as a dispersing agent. Thereafter, the flask was cooled to $-5$° C., and gradually charged with 0.72 ml of water by means of a pipette. Successively, the reaction was carried out at $-5$° C. for 40 minutes, the temperature was then elevated up to 80° C. over a period of 1 hour, and the reaction was continued at that temperature for 3 hours. After this 3-hour reaction, the Teflon columns were removed by screening from the reaction mixture, and said reaction mixture was subjected to solid-liquid separation by filtration to obtain a benzene-insoluble organoaluminum oxy-compound. A concentration of aluminum dissolved in the filtrate was measured, whereby the measured concentration was less than the detection limit of 5 mg-Al/l.

To a 200 ml reactor equipped with a stirrer were added 100 mg in terms of Al atom of the thus obtained benzene-insoluble organoaluminum oxy-compound and 100 ml of benzene, and the mixture was stirred at 60° C. for 6 hours to prepare a suspension. With G5 glass filter equipped with a jacket, the suspension was filtered, while maintaining silicone oil poured in the jacket at 60° C., and the compound on glass filter was then washed with 50 ml of benzene kept at 60° C. four times. The filtrate was recovered, and an amount of Al present in the filtrate was measured, whereby Al corresponding to 0.7 mmole was detected. That is, it was considered that the amount of Al component of the above-mentioned organoaluminum oxy-compound which dissolves in benzene kept at 60° C. is 0.7% in terms of Al atom. Further, IR measurement of the solid organoaluminum oxy-compound obtained above was conducted, whereby an absorption of Al-O-Al atom group was observed in the IR spectrum at 600–800 $cm^{-1}$, and a ($D_{1260}/D_{1220}$) ratio of an absorbance ($D_{1260}$) at 1260 $cm^{-1}$ to an absorbance ($D_{1220}$) at 1220 $cm^{-1}$ was 0.053. Evolution of methane was observed when the solid organoaluminum oxy-compound was decomposed with water.

Polymerization

A 2 liter stainless steel autoclave thoroughly purged with nitrogen wa charged with 900 ml of 4-methyl-1-pentene, followed by rise in temperature up to 130° C. Into the autoclave were injected 1.14 ml of a suspension of the benzene-insoluble organoaluminum oxy-compound prepared above in toluene (0.44 mole-Al/l) and 1 ml of a solution of bis(methylcyclopentadienyl)zirconium dichloride in toluene (0.001 mole-Zr/l) together with ethylene to initiate polymerization. The polymerization was carried out at the total pressure of 20 kg/cm$^2$-G and 140° C. for 30 minutes while continuously feeding ethylene to the polymerization system, whereby 12.0 g of an ethylene/4-methyl-1-pentene copolymer having an intrinsic viscosity [$\eta$] of 0.47 dl/g as measured at 135° C. in decalin, a density of 0.908 g/cm$^3$ and $\overline{Mw}/\overline{Mn}$ of 2.4 was obtained.

COMPARATIVE EXAMPLE 1

The polymerization of Example 1 was carried out in the same manner as in Example 1 except that in place of the benzene-insoluble organoaluminum oxy-compound, there was used the solution of the aluminoxane in toluene prepared in Example 1 in an amount of 0.5 mg atom in terms of Al atom, whereby 8.4 g of an ethylene/4-methyl-1-pentene copolymer having an intrinsic viscosity [$\eta$] of 0.41 dl/g, a density of 0.910 g/cm$^3$ and $\overline{Mw}\,\overline{Mn}$ of 2.5 was obtained.

EXAMPLE 2

Preparation of benzene-insoluble organoaluminum compound

A 400 ml glass flask thoroughly purged with nitrogen was charged with 134 ml of toluene and 10.9 g of Al$_2$(SO$_4$)$_3$·14H$_2$O classified by a 32-mesh screen and left on the screen, and the contents of the flask were brought to a state of suspension. Thereto was added at room temperature 100 ml of a solution of aluminoxane prepared in the same manner as in Example 1 in toluene (2.34 moles-Al/l). Successively, the temperature of the flask was elevated to 80° C. and stirred at that temperature for 7 hours. Thereafter, the formed aluminum sulfate compound present in the reaction mixture was removed in a nitrogen atmosphere by means of a 80-mesh screen, and the remaining reaction mixture was subjected to solid-liquid separation by filtration to obtain a benzene-insoluble organoaluminum oxy-compound. A concentration of aluminum dissolved in the filtrate was measured, whereby the aluminum concentration was less than the detection limit of 5 mg-Al/l.

A solubility of the thus obtained organoaluminum oxy-compound in benzene kept at 60° C. as measured in the same manner as in Example 1 was 0.3%.

Furthermore, a (i$_{1260}$/D$_{1220}$) ratio of an absorbance (D$_{1260}$) at 1260 cm$^{-1}$ to an absorbance (D$_{1220}$) at 1220 cm$^{-1}$ was 0.067.

Polymerization

The polymerization of Example 1 was repeated except that the benzene-insoluble organoaluminum oxy-compound as prepared above was used, whereby 10.8 g of an ethylene/4-methyl-1-pentene copolymer having an intrinsic viscosity [$\eta$] of 0.49 dl/g, a density of 0.907 g/cm$^3$ and $\overline{Mw}/\overline{Mn}$ of 2.6 was obtained.

EXAMPLE 3

Preparation of benzene-insoluble organoaluminum oxy-compound

A 400 ml glass flask thoroughly purged with nitrogen was charged with 32.8 ml of toluene and 0.78 g of ground magnesium chloride hexahydrate, and the contents of the flask were slurried. Thereto was added at room temperature 25 ml of a solution of the aluminoxane prepared in Example 1 in toluene (2.31 mole-Al/l). Thereafter, the temperature of the flask was elevated to 80° C. and stirred at that temperature for 7 hours. After the 7-hour stirring, the reaction mixture was subjected to solid-liquid separation by filtration to obtain a benzene-insoluble organoaluminum oxy-compound. A concentration of aluminum dissolved in the filtrate was measured, whereby the measured aluminum concentration was less than the detection limit (5 mg-Al/l).

A solubility of the thus obtained organoaluminum oxy-compound in benzene kept at 60° C. as measured in the same manner as in Example 1 was 0.3%.

Polymerization

The polymerization of Example 1 was repeated except that there was used the benzene-insoluble organoaluminum oxy-compound as prepared above, whereby 11.3 g of an ethylene/4-methyl-1-pentene copolymer having an intrinsic viscosity [$\eta$] of 0.46 dl/g, a density of 0.907 g/cm$^3$ and $\overline{Mw}/\overline{Mn}$ of 2.5 was obtained.

EXAMPLES 4-6

The polymerization of Example 1 was repeated except that each of transition metal compounds as shown in Table 1 was used.

Results obtained are shown in Table 1.

TABLE 1

| Example | Transition metal compound Kind | (mmole) | Yield of polymer (g) | [$\eta$] (dl/g) | Density (g/cm$^3$) | $\overline{Mw}/\overline{Mn}$ |
|---|---|---|---|---|---|---|
| 3 | (MeCp)$_2$ ZrCl$_2$ | 0.001 | 11.3 | 0.46 | 0.907 | 2.5 |
| 4 | Cp$_2$ ZrCl$_2$ | 0.001 | 6.5 | 0.40 | 0.912 | 2.6 |
| 5 | Cp$_2$ ZrMe$_2$ | 0.001 | 4.8 | 0.41 | 0.913 | 2.5 |
| 6 | (Ind)$_2$ ZrCl$_2$ | 0.001 | 12.8 | 0.52 | 0.906 | 2.4 |

Cp; Cyclopentadienyl group
Ind; Indenyl group
MeCp; Methylcyclopentadienyl group
Me; Methyl group

EXAMPLE 7 polymerization

A 2 liter stainless steel autoclave thoroughly purged with nitrogen was charged with 900 ml of 4-methyl-1-pentene, followed by rise in temperature up to 130° C. Into the autoclave were injected 1.14 ml of a suspension of the benzene-insoluble organoaluminum oxy-compound prepared in Example 1 in toluene (0.44 mole-Al/l) and 2 ml of a solution of ethylenebis(indenyl)zirconium dichloride in toluene (0.0005 mole-Zr/l) to initiate polymerization. The polymerization was carried out at the total pressure of 20 kg/cm$^2$-G and 130° C. for 30 minutes while continuously feeding the ethylene thereto, whereby 26.1 g of an ethylene/4-methyl-1-pentene copolymer having an intrinsic viscosity [$\eta$] of 0.48 dl/g as measured at 135° C. in decalin, a density of 0.895 g/cm$^3$ and $\overline{Mw}/\overline{Mn}$ of 2.4 was obtained.

COMPARATIVE EXAMPLE 2

The polymerization of Example 7 was repeated except that in place of the benzene-insoluble organoaluminum oxy-compound, there was used a solution of the aluminoxane prepared in Example 1 in toluene in an amount of 0.5 mg atom in terms of Al atom, whereby 20.8 g of an ethylene/4-methyl-1-pentene copolymer having an intrinsic viscosity [$\eta$] of 0.37 dl/g, a density of 0.897 g/cm$^3$ and $\overline{M}w/\overline{M}n$ of 2.4 was obtained.

EXAMPLE 8

Polymerization

The polymerization of Example 7 was repeated except that there was used the benzene-insoluble organoaluminum oxy-compound prepared in Example 2, whereby 24.8 g of an ethylene/4-methyl-1-pentene copolymer having an intrinsic viscosity [$\eta$] of 0.45 dl/g, a density of 0.893 g/cm$^3$ and $\overline{M}w/\overline{M}n$ of 2.5 was obtained.

EXAMPLE 9

Polymerization

The polymerization of Example 7 was repeated except that there was used the benzene-insoluble organoaluminum oxy-compound prepared in Example 3, whereby 35.6 g of an ethylene/4-methyl-1-pentene copolymer having an intrinsic viscosity [$\eta$] of 0.46 dl/g, a density of 0.894 g/cm$^3$ and $\overline{M}w/\overline{M}n$ of 2.3 was obtained.

EXAMPLE 10 polymerization

A 2 liter stainless steel autoclave thoroughly purged with nitrogen was charged with 900 ml of 4-methyl-1-pentene, followed by rise in temperature up to 50° C. To the autoclave were added 1 ml of a solution of triisobutylaluminum in toluene (1 mole-Al/l) and 0.22 ml of a suspension of the benzene-insoluble organoaluminum oxy-compound prepared in Example 1 in toluene (0.44 mole-Al/l). The temperature was further elevated up to 75° C., and 1 ml of a solution of bis(methylcyclopentadienyl)zirconium dichloride in toluene (0.001 mole-Zr/l) was injected, together with ethylene, into the autoclave to initiate polymerization. The polymerization was carried out at the total pressure of 8 kg/cm$^2$-G and 80° C. for 40 minutes, whereby 85.8 g of an ethylene/4-methyl-1-pentene copolymer having MFR of 1.03 g/10 min, a density of 0.884 g/cm$^3$ and $\overline{M}w/\overline{M}n$ of 2.1 was obtained.

COMPARATIVE EXAMPLE 3

The polymerization of Example 10 was repeated except that in place of the benzene-insoluble organoaluminum oxy-compound, there was used the aluminoxane prepared in Example 1 in an amount of 0.1 mg atom in terms of Al atom, whereby 40.9 g of an ethylene/4-methyl-1-pentene copolymer having MFR of 0.82 g/10 min, a density of 0.887 g/cm$^3$ and $\overline{M}w/\overline{M}n$ of 2.2 was obtained.

COMPARATIVE EXAMPLE 4

The polymerization of Example 10 was repeated except that in place of the benzene-insoluble organoaluminum oxy-compound, there was used the aluminoxane prepared in Example 1 in an amount of 0.5 mg atom in terms of Al atom, and no triisobutylaluminum was used, whereby 50.1 g of an ethylene/4-methyl-1-pentene copolymer having MFR of 9.55 g/10 min, a density of 0.890 g/cm$^3$ and $\overline{M}w/\overline{M}n$ of 2.2 was obtained.

EXAMPLE 11

Polymerization

A 500 ml glass autoclave thoroughly purged with nitrogen was charged with 350 ml of toluene and 25 ml of 1-octene, followed by rise in temperature up to 65° C. Thereafter, ethylene gas was passed through the autoclave at a rate of 120 l/hr, and thereto were added 0.5 mmole of triisobutylaluminum, 0.2 mg atom-Al of the benzene-insoluble organoaluminum oxy-compound prepared in Example 2 and 0.002 mmole of bis(cyclopentadienyl)zirconium dichloride in that order to initiate polymerization. The polymerization was carried out at ordinary pressure and 70° C. for 30 minutes while continuously feeding ethylene gas thereto, whereby 14.9 g of an ethylene/1-octene copolymer having MFR of 3.90 g/10 min, a density of 0.902 g/cm$^3$ and $\overline{M}w/\overline{M}n$ of 2.4 was obtained.

EXAMPLE 12

Polymerization

The polymerization of Example 7 was repeated except that there was used the benzene-insoluble organoaluminum oxy-compound prepared in Example 3, whereby 90.4 g of an ethylene/4-methyl-1-pentene copolymer having MFR of 1.68 g/10 min, a density of 0.887 g/cm$^3$ and $\overline{M}w/\overline{M}n$ of 2.1 was obtained.

EXAMPLES 13-17

The polymerization of Example 12 was repeated except that each of transition metal compounds and organoaluminum compounds respectively shown in Table 2 was used.

Results obtained are shown in Table 2.

TABLE 2

| | Transition metal compound | | Organoaluminum compound | | Yield of | MFR | Density | |
|---|---|---|---|---|---|---|---|---|
| Example | Kind | (mmole) | Kind | (mmole) | polymer (g) | (g/10 min) | (g/cm$^3$) | $\overline{M}w/\overline{M}n$ |
| 12 | (MeCp)$_2$ ZrCl$_2$ | 0.001 | Tri-isobutyl aluminum | 1 | 90.4 | 1.68 | 0.887 | 2.1 |
| 13 | Cp$_2$ ZrCl$_2$ | 0.001 | Tri-isobutyl aluminum | 1 | 60.3 | 4.95 | 0.895 | 2.2 |
| 14 | Cp$_2$ ZrMe$_2$ | 0.001 | Tri-isobutyl aluminum | 1 | 57.3 | 5.11 | 0.894 | 2.3 |
| 15 | (Ind)$_2$ ZrCl$_2$ | 0.001 | Tri-isobutyl aluminum | 1 | 83.1 | 1.05 | 0.888 | 2.2 |
| 16 | (MeCp)$_2$ ZrCl$_2$ | 0.001 | Tri-isobutyl aluminum | 0.25 | 88.5 | 2.02 | 0.888 | 2.1 |
| 17 | (MeCp)$_2$ ZrCl$_2$ | 0.001 | Tri-2-ethylhexyl aluminum | 1 | 85.7 | 1.50 | 0.889 | 2.3 |

Cp; Cyclopentadienyl group
Ind; Indenyl group
MeCp; Methylcyclopentadienyl group
Me; Methyl group

EXAMPLE 18 polymerization

A 2 liter stainless steel autoclave thoroughly purged with nitrogen was charged with 900 ml of 4-methyl-1-pentene, followed by rise in temperature up to 50° C. To the autoclave were added 0.22 ml of a suspension of the benzene-insoluble organoaluminum oxy-compound prepared in Example 1 in toluene (0.44 mole-Al/l) and 1 ml of a solution of (i-Bu)$_2$Al-O-Al(i-Bu)$_2$(1 mole-Al/l). After elevating the temperature to 75° C., 1 ml of a solution of bis(methylcyclopentadienyl)zirconium dichloride in toluene (0.001 mole-Zr/l) was injected, together with ethylene, into the autoclave to initiate polymerization. The polymerization was carried out at the total pressure of 8 kg/cm$^2$-G and 80° C. for 40 minutes while continuously feeding ethylene thereto, whereby 83.9 g of an ethylene/4-methyl-1-pentene copolymer having MFR of 0.93 g/10 min, a density of 0.883 g/cm$^3$ and $\overline{M}w/\overline{M}n$ of 2.2 was obtained.

COMPARATIVE EXAMPLE 5

The polymerization of Example 18 was repeated except that in place of the benzene-insoluble organoaluminum oxy-compound, there was used the aluminoxane prepared in Example 1 in an amount of 0.1 mg atom in terms of Al atom, whereby 43.2 g of an ethylene/4-methyl-1-pentene copolymer having MFR of 0.78 g/10 min, a density of 0.888 g/cm$^3$ and $\overline{M}w/\overline{M}n$ of 2.2 was obtained.

COMPARATIVE EXAMPLE 6

The polymerization of Example 18 was repeated except that in place of the benzene-insoluble organoaluminum oxy-compound, there was used the aluminoxane prepared in Example 1 in an amount of 0.5 mg atom in terms of Al atom, and no (i-Bu)$_2$Al-O-Al(i-Bu)$_2$ was used, whereby 50.1 g of an ethylene/4-methyl-1-pentene copolymer having MFR of 9.55 g/10 min, a density of 0.890 g/cm$^3$ and $\overline{M}w/\overline{M}n$ of 2.2 was obtained.

EXAMPLE 19

Polymerization

A 500 ml glass autoclave thoroughly purged with nitrogen was charged with 350 ml of toluene and 25 ml of 1-octene, followed by rise in temperature up to 65° C. Thereafter, ethylene gas was passed through the autoclave at a rate of 120 l/hr, and thereto were added 0.5 mmole of (i-Bu)$_2$AlOMe, 0.2 mg atom-Al of the benzene-insoluble organoaluminum oxy-compound prepared in Example 2 and 0.002 mmole of bis(cyclopentadienyl)zirconium dichloride in that order to initiate polymerization. The polymerization was carried out at ordinary pressure and 70° C. for 30 minutes while continuously feeding ethylene gas thereto, whereby 11.5 g of an ethylene/1-octene copolymer having MFR of 5.12 g/10 min, a density of 0.906 g/cm$^3$ and $\overline{M}w/\overline{M}n$ of 2.3 was obtained.

EXAMPLE 20

Polymerization

The polymerization of Example 18 was repeated except that there was used the benzene-insoluble organoaluminum oxy-compound prepared in Example 3, whereby 95.4 g of an ethylene/4-methyl-1-pentene copolymer having MFR of 1.51 g/10 min, a density of 0.885 g/cm$^3$ and $\overline{M}w/\overline{M}n$ of 2.1 was obtained.

EXAMPLES 21-24

The polymerization of Example 20 was repeated except that each of transition metal compounds and organoaluminum compounds respectively shown in Table 3 was used.

Results obtained are shown in Table 3.

TABLE 3

| Example | Transition metal compound Kind | (mmole) | Yield of polymer (g) | MFR (g/10 min) | Density (g/cm$^3$) | $\overline{M}w/\overline{M}n$ |
|---|---|---|---|---|---|---|
| 20 | (MeCp)$_2$ ZrCl$_2$ | 0.001 | 95.4 | 1.51 | 0.885 | 2.1 |
| 21 | Cp$_2$ ZrCl$_2$ | 0.001 | 62.5 | 5.55 | 0.893 | 2.1 |
| 22 | Cp$_2$ ZrMe$_2$ | 0.001 | 54.9 | 6.02 | 0.895 | 2.3 |
| 23 | (Ind)$_2$ ZrCl$_2$ | 0.001 | 85.2 | 0.96 | 0.887 | 2.2 |
| 24* | (MeCp)$_2$ ZrCl$_2$ | 0.001 | 97.5 | 2.66 | 0.882 | 2.3 |

*Amount of (i-Bu)$_2$Al—O—Al(i-Bu)$_2$ used 0.25 mg atom-Al
Cp; Cyclopentadienyl group
Ind; Indenyl group
MeCp; Methylcyclopentadienyl group
Me; Methyl group

EXAMPLE 25 polymerization

A 2 liter stainless steel autoclave thoroughly purged with nitrogen was charged with 600 ml of toluene and 300 ml of 4-methyl-1-pentene, followed by rise in temperature up to 50° C. To the autoclave were added 0.11 ml of a suspension of the benzene-insoluble organoaluminum oxy-compound prepared in Example 1 in toluene (0.44 mole-Al/l) and 1 ml of a solution of triisobutylaluminum in toluene (1 mole-Al/l). After elevating further the temperature to 75° C., 0.3 ml of a solution of ethylenebis(indenyl)zirconium dichloride in toluene (0.0005 mole-Zr/l) was injected, together with ethylene, into the autoclave to initiate polymerization. The polymerization was carried out at the total pressure of 8 kg/cm$^2$-G and 80° C. for 40 minutes while continuously feeding ethylene thereto, whereby 98.9 g of an ethylene/4-methyl-1-pentene copolymer having MFR of 14.0 g/10 min, a density of 0.898 g/cm$^3$ and $\overline{M}w/\overline{M}n$ of 2.3 was obtained.

COMPARATIVE EXAMPLE 7

The polymerization of Example 25 was repeated except that in place of the benzene-insoluble organoaluminum oxy-compound, there was used the aluminoxane prepared in Example 1 in an amount of 0.05 mg atom in terms of Al atom, whereby 55.1 g of an ethylene/4-methyl-1-pentene copolymer having MFR of 9.73 g/10 min, a density of 0.905 g/cm$^3$ and $\overline{M}w/\overline{M}n$ of 2.3 was obtained.

COMPARATIVE EXAMPLE 8

The polymerization of Example 25 was repeated except that in place of the benzene-insoluble organoaluminum oxy-compound, there was used the aluminoxane prepared in Example 1 in an amount of 0.5 mg atom in terms of Al atom, and no triisobutylaluminum was used, whereby 62.8 g of an ethylene/4-methyl-1-pentene copolymer having $\overline{MFR}$ of 35.6 g/10 min, a density of 0.897 g/cm$^3$ and $\overline{Mw}/\overline{Mn}$ of 2.2 was obtained.

EXAMPLE 26

Polymerization

A 500 ml glass autoclave thoroughly purged with nitrogen was charged with 250 ml of toluene and elevated in temperature up to 65° C. while passing therethrough propylene gas. Thereafter, 0.5 mmole of triisobutylaluminum, 0.5 mg atom in terms of aluminum atom of the benzene-insoluble organoaluminum oxy-compound prepared in Example 2 and 0.005 mmole of ethylenebis(indenyl)zirconium dichloride were successively added to the autoclave to initiate polymerization. The polymerization was carried out at ordinary pressure and 70° C. for 1 hour while continuously feeding propylene gas thereto, whereby 16.9 g of isotactic polypropylene having an intrinsic viscosity $[\eta]$ of 0.28 dl/g as measured at 135° C. in decalin and $\overline{Mw}/\overline{Mn}$ of 1.9 was obtained.

COMPARATIVE EXAMPLE 9

The polymerization of Example 26 was repeated except that in place of the benzene-insoluble organoaluminum oxy-compound, there was used a solution of the aluminoxane prepared in Example 1 in toluene in an amount of 2.5 mg atom in terms of aluminum atom, and no triisobutylaluminum was used, whereby 12.0 g of isotactic polypropylene having an intrinsic viscosity $[\eta]$ of 0.14 dl/g and $\overline{Mw}/\overline{Mn}$ of 1.9 was obtained.

EXAMPLE 27

Polymerization

The polymerization of Example 25 was repeated except that the amount of triisobutylaluminum used was changed to 0.25 mmole, and the benzene-insoluble organoaluminum oxy-compound prepared in Example 3 was used in an amount of 0.05 mg atom in terms of aluminum atom, whereby 93.3 g of an ethylene/4-methyl-1-pentene copolymer having $\overline{MFR}$ of 11.5 g/10 min, a density of 0.900 g/cm$^3$ and $\overline{Mw}/\overline{Mn}$ of 2.3 was obtained.

EXAMPLE 28

The polymerization of Example 27 was repeated except that in place of the 4-methyl-1-pentene, 1-octene was used, and the amount of the ethylenebis(indenyl)zirconium dichloride and triisobutylaluminum used were changed to 7×10$^{-8}$ mole and 1 mmole, respectively, whereby 70.8 g of an ethylene/1-octene copolymer having $\overline{MFR}$ of 8.94 g/10 min, a density of 0.896 g/cm$^3$ and $\overline{Mw}/\overline{Mn}$ of 2.2 was obtained.

EXAMPLE 29

The polymerization of Example 27 was repeated except that in place of the triisobutylaluminum, 0.5 mmole of tri-2-ethylhexylaluminum was used, whereby 90.5 g of an ethylene/4-methyl-1-pentene copolymer having $\overline{MFR}$ of 12.1 g/10 min, a density of 0.900 g/cm$^3$ and $\overline{Mw}/\overline{Mn}$ of 2.4 was obtained.

EXAMPLE 30 polymerization

A 2 liter stainless steel autoclave thoroughly purged with nitrogen was charged with 600 ml of toluene and 300 ml of 4-methyl-1-pentene, followed by rise in temperature up to 50° C. To the autoclave were added 0.11 ml of a suspension of the benzene-insoluble organoaluminum oxy-compound prepared in Example 1 in toluene (0.44 mole-Al/l) and 1 ml of a solution of (i-Bu)$_2$Al-O-Al(i-Bu)$_2$ in toluene (1 mole-Al/l). After elevating the temperature to 75° C., 0.3 ml of a solution of ethylenebis(indenyl)zirconium dichloride in toluene (0.005 mole-Zr/l) was injected, together with ethylene, into the autoclave to initiate polymerization. The polymerization was carried out at the total pressure of 8 kg/cm$^2$-G and 80° C. for 40 minutes while continuously feeding ethylene thereto, whereby 101.2 g of an ethylene/4-methyl-1-pentene copolymer having $\overline{MFR}$ of 14.6 g/10 min, a density of 0.899 g/cm$^3$ and $\overline{Mw}/\overline{Mn}$ of 2.2 was obtained.

COMPARATIVE EXAMPLE 10

The polymerization of Example 30 was repeated except that in place of the benzene-insoluble organoaluminum oxy-compound, there was used the aluminoxane prepared in Example 1 in an amount of 0.05 mg atom in terms of Al atom, whereby 53.9 g of an ethylene/4-methyl-1-pentene copolymer having $\overline{MFR}$ of 10.6 g/10 min, a density of 0.904 g/cm$^3$ and $\overline{Mw}/\overline{Mn}$ of 2.3 was obtained.

COMPARATIVE EXAMPLE 11

The polymerization of Example 30 was repeated except that in place of the benzene-insoluble organoaluminum oxy-compound, there was used a solution of the aluminoxane prepared in Example 1 in toluene in an amount of 0.5 mg atom in terms of Al atom, and no (i-Bu)$_2$Al-O-Al(i-Bu)$_2$ was used, whereby 62.8 g of an ethylene/4-methyl-1-pentene copolymer having $\overline{MFR}$ of 35.6 g/10 min, a density of 0.897 g/cm$^3$ and $\overline{Mw}/\overline{Mn}$ of 2.2 was obtained.

EXAMPLE 31

Polymerization

A 500 ml glass autoclave thoroughly purged with nitrogen was charged with 250 ml of toluene, followed by rise in temperature up to 65° C. while passing propylene gas therethrough. Thereafter, 0.5 mg atom in terms of aluminum atom of (i-Bu)$_2$Al-O-Al(i-Bu)$_2$, 0.5 mg atom in terms of aluminum atom of the benzene-insoluble organoaluminum oxy-compound prepared in Example 2 and 0.005 mmole of ethylenebis(indenyl)zirconium dichloride were successively added to the autoclave to initiate polymerization. The polymerization was carried out at ordinary pressure and 70° C. for 1 hour while continuously feeding propylene gas thereto, whereby 17.5 g of isotactic polypropylene having an intrinsic viscosity $[\eta]$ of 0.30 dl/g as measured at 135° C. in decalin and $\overline{Mw}/\overline{Mn}$ of 2.0 was obtained.

COMPARATIVE EXAMPLE 12

The polymerization of Example 31 was repeated except that in place of the benzene-insoluble organoaluminum oxy-compound, there was used 2.5 mg atom in terms of aluminum atom of the aluminoxane prepared in Example 1, and no (i-Bu)$_2$Al-O-Al(i-Bu)$_2$ was used, whereby 12.0 g of isotactic polypropylene having an intrinsic viscosity [$\eta$] of 1.9 was obtained.

EXAMPLE 32

Polymerization

The polymerization of Example 30 was repeated except that the amount of (i-Bu)$_2$Al-O-Al(i-Bu)$_2$ used was changed to 0.25 mg atom in terms of aluminum atom and the amount of the benzene-insoluble organoaluminum oxy-compound prepared in Example 3 used wa changed to 0.05 mg atom in terms of aluminum atom, whereby 95.6 g of an ethylene/4-methyl-1-pentene copolymer having MFR of 10.0 g/10 min, a density of 0.899 g/cm$^3$ and $\overline{M}w/\overline{M}n$ of 2.2 was obtained.

EXAMPLE 33

The polymerization of Example 32 was repeated except that in place of the 4-methyl-1-pentene, there was used 1-octene, and the amounts of ethylenebis(indenyl)zirconium dichloride and (i-Bu)$_2$Al-O-Al(i-Bu)$_2$ used were 7×10$^{-8}$ mole and 1 mg atom in terms of aluminum atom, respectively, whereby 78.1 g of an ethylene/1-octene copolymer having MFR of 9.22 g/10 min, a density of 0.894 g/cm$^3$ and $\overline{M}w/\overline{M}n$ of 2.2 was obtained.

EXAMPLE 34

The polymerization of Example 32 was repeated except that in place of the (i-Bu)$_2$Al-O-Al(i-Bu)$_2$ there was used 2.0 mmoles of (i-Bu)$_2$AlOMe, whereby 71.6 g of an ethylene/4-methyl-1-pentene copolymer having MFR of 18.0 g/10 min, a density of 0.902 g/cm$^3$ and $\overline{M}w/\overline{M}n$ of 2.3 was obtained.

EXAMPLE 35

Polymerization

A 2 liter stainless steel autoclave thoroughly purged with nitrogen was charged with 900 ml of 4-methyl-1-pentene, followed by rise in temperature up to 50° C. To the autoclave were added 0.22 ml of a suspension of the benzene-insoluble organoaluminum oxy-compound prepared in Example 1 in toluene (0.44 mole-Al/l) and 1 ml of a solution of an aluminoxane having at least one hydrocarbon group other than n-alkyl group bonded to the aluminum atom,

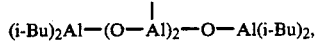

i.e. (i-Bu)$_2$Al—(O—Al)$_2$—O—Al(i-Bu)$_2$ in toluene (1 mole-Al/l).

After elevating the temperature to 75° C., 1 ml of a solution of bis(methylcyclopentadienyl)zirconium dichloride in toluene (0.001 mole-Zr/l) was injected, together with ethylene, into the autoclave to initiate polymerization. The polymerization was carried out at the total pressure of 8 kg/cm$^2$-G and 80° C. for 40 minutes while continuously feeding ethylene thereto, whereby 82.6 g of an ethylene/4-methyl-1-pentene copolymer having MFR of 1.10 g/10 min, a density of 0.887 g/cm$^3$ and $\overline{M}w/\overline{M}n$ of 2.3 was obtained.

COMPARATIVE EXAMPLE 13

The polymerization of Example 35 was repeated except that in place of the benzene-insoluble organoaluminum oxy-compound, there was used 0.1 mg atom in terms of Al atom of the aluminoxane prepared in Example 1, whereby 41.0 g of an ethylene/4-methyl-1-pentene copolymer having MFR of 0.85 g/10 min, a density of 0.891 g/cm$^3$ and $\overline{M}w/\overline{M}n$ of 2.2 was obtained.

COMPARATIVE EXAMPLE 14

The polymerization of Example 35 was repeated except that in place of the benzene-insoluble organoaluminum oxy-compound, there was used 0.5 mg atom in terms of Al atom of the aluminoxane prepared in Example 1, and no

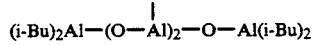

was used, whereby 50.1 g of an ethylene/4-methyl-1-pentene copolymer having MFR of 9.55 g/10 min, a density of 0.890 g/cm$^3$ and $\overline{M}w/\overline{M}n$ of 2.2 was obtained.

EXAMPLE 36

Polymerization

A 500 ml glass autoclave thoroughly purged with nitrogen was charged with 350 ml of toluene and 25 ml of 1-octene, followed by rise in temperature up to 65° C. Thereafter, ethylene gas was passed at a rate of 120 1/hr therethrough, and 0.5 mg atom-Al of (i-Bu)$_2$Al—(O—Al)$_2$—O—Al(i-Bu)$_2$, with i-Bu substituent, 0.2 mg atom-Al of the benzene-insoluble organoaluminum oxy-compound prepared in Example 2 and 0.002 mmole of bis(cyclopentadienyl)zirconium dichloride were successively added to the autoclave to initiate polymerization. The polymerization was carried out at 70° C. for 30 minutes while continuously feeding ethylene gas thereto, whereby 13.5 g of an ethylene/1-octene copolymer having MFR of 4.20 g/10 min, a density of 0.904 g/cm$^3$ and $\overline{M}w/\overline{M}n$ of 2.3 was obtained.

EXAMPLE 37

Polymerization

The polymerization of Example 35 was repeated except that there was used the benzene-insoluble organoaluminum oxy-compound prepared in Example 3, whereby 82.3 g of an ethylene/4-methyl-1-pentene copolymer having MFR of 1.05 g/10 min, a density of 0.888 g/cm$^3$ and $\overline{M}w/\overline{M}n$ of 2.3 was obtained.

EXAMPLES 38–42

The polymerization of Example 35 was repeated except that each of transition metal compounds and organoaluminum compounds respectively shown in Table 4 was used to obtain results as shown in Table 4.

TABLE 4

| Example | Transition metal compound Kind | (mmole) | Yield of polymer (g) | MFR (g/10 min) | Density (g/cm$^3$) | $\overline{Mw}/\overline{Mn}$ |
|---|---|---|---|---|---|---|
| 37 | (MeCp)$_2$ ZrCl$_2$ | 0.001 | 82.3 | 1.05 | 0.888 | 2.3 |
| 38 | Cp$_2$ ZrCl$_2$ | 0.001 | 60.1 | 4.78 | 0.895 | 2.2 |
| 39 | Cp$_2$ ZrMe$_2$ | 0.001 | 49.5 | 6.20 | 0.897 | 2.4 |
| 40 | (Ind)$_2$ ZrCl$_2$ | 0.001 | 79.1 | 1.87 | 0.888 | 2.3 |
| 41* | (MeCp)$_2$ ZrCl$_2$ | 0.001 | 80.6 | 1.50 | 0.887 | 2.2 |
| 42** | (MeCp)$_2$ ZrCl$_2$ | 0.001 | 76.4 | 2.10 | 0.887 | 2.4 |

*(i-Bu)$_2$Al—(O—Al)$_2$—Al(i-Bu)$_2$ 0.50 mg atom-Al used.
            |
           i-Bu

**Isobutyl aluminoxane (molecular weight of 1090 measured by cryoscopic method) 1.0 mg atom-Al used.

EXAMPLE 43

Polymerization

A 2 liter stainless steel autoclave thoroughly purged with nitrogen was charged with 600 ml of toluene and 300 ml of 4-methyl-1-pentene, followed by rise in temperature up to 50° C. To the autoclave were added 0.11 ml of a suspension of the benzene-insoluble organoaluminum oxy-compound prepared in Example 1 in toluene (0.44 mole-Al/l) and 1 ml of a solution of an aluminoxane having at least one hydrocarbon group other than n-alkyl group bonded to the aluminum atom, i.e. (i-Bu)$_2$Al—(O—Al)$_2$—O—Al(i-Bu)$_2$ in toluene (1 mole-Al/l).
                |
              i-Bu After elevating the temperature to 75° C., 0.3 ml of a solution of ethylenebis(indenyl)zirconium dichloride in toluene (0.0005 mole-Zr/l) was injected, together with ethylene, into the autoclave to initiate polymerization. The polymerization was carried out at the total pressure of 8 kg/cm$^2$-G and 80° C. for 40 minutes while continuously feeding ethylene thereto, whereby 89.5 g of an ethylene/4-methyl-1-pentene copolymer having MFR of 9.08 g/10 min, a density of 0.900 g/cm$^3$ and $\overline{Mw}/\overline{Mn}$ of 2.4 was obtained.

COMPARATIVE EXAMPLE 15

The polymerization of Example 43 was repeated except that in place of the benzene-insoluble organoaluminum oxy-compound, there was used 0.05 mg atom in terms of Al atom of the aluminoxane prepared in Example 1, whereby 50.2 g of an ethylene/4-methyl-1-pentene copolymer having MFR of 7.55 g/10 min, a density of 0.905 g/cm$^3$ and $\overline{Mw}/\overline{Mn}$ of 2.3 was obtained.

COMPARATIVE EXAMPLE 16

The polymerization of Example 43 was repeated except that in place of the benzene-insoluble organoaluminum oxy-compound, there was used 0.5 mg atom in terms of Al atom of the aluminoxane prepared in Example 1, and no i-Bu
             |
(i-Bu)$_2$Al—(O—Al)$_2$—O—Al(i-Bu)$_2$ was used, whereby 62.8 g of an ethylene/4-methyl-1-pentene copolymer having MFR of 35.6 g/10 min, a density of 0.897 g/cm$^3$ and $\overline{Mw}/\overline{Mn}$ of 2.2 was obtained.

EXAMPLE 44

Polymerization

A 500 ml glass autoclave thoroughly purged with nitrogen was charged with 250 ml of toluene and elevated in temperature up to 65° C. while passing propylene gas therethrough. Thereafter, 0.5 mg atom-Al in terms of aluminum atom of, i-Bu
             |
(i-Bu)$_2$Al—(O—Al)$_2$—O—Al(i-Bu)$_2$, 0.5 mg atom in terms of aluminum atom of the benzene-insoluble organoaluminum oxy-compound prepared in Example 2 and 0.005 mmole of ethylenebis(indenyl)zirconium dichloride were successively added to the autoclave to initiate polymerization. The polymerization was carried out at 70° C. for 1 hour while continuously feeding propylene gas thereto, whereby 15.7 g of isotactic polypropylene having an intrinsic viscosity [η] of 0.27 dl/g as measured at 135° C. in decalin and $\overline{Mw}/\overline{Mn}$ of 1.9 was obtained.

COMPARATIVE EXAMPLE 17

The polymerization of Example 44 was repeated except that in place of the benzene-insoluble organoaluminum oxy-compound, there was used 2.5 mg atom in terms of aluminum atom of the aluminoxane prepared in Example 1, and no i-Bu
             |
(i-Bu)$_2$Al—(O—Al)$_2$—O—Al(i-Bu)$_2$ was used, whereby 12.0 g of isotactic polypropylene having an intrinsic viscosity [η] of 0.14 dl/g and $\overline{Mw}/\overline{Mn}$ of 1.9 was obtained.

EXAMPLE 45

Polymerization

The polymerization of Example 43 was repeated except that the amount of i-Bu
             |
(i-Bu)$_2$Al—(O—Al)$_2$—O—Al(i-Bu)$_2$ used was changed to 0.5 mg atom-Al, and there was used 0.05 mg atom-Al of the benzene-insoluble organoaluminum oxy-compound prepared in Example 3, whereby 88.2 g of an ethylene/4-methyl-1-pentene copolymer having MFR of 12.2 g/10 min, a density of 0.901 g/cm$^3$ and $\overline{Mw}/\overline{Mn}$ of 2.3 was obtained.

EXAMPLE 46

The polymerization of Example 45 was repeated except that in place of the 4-methyl-1-pentene, there was used 1-octene, and $7 \times 10^{-8}$ mole of ethylenebis(indenyl)zirconium dichloride and 1 mg atom-Al of

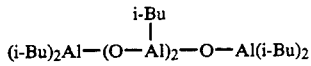

was used, whereby 74.4 g of an ethylene/1-octene copolymer having $\overline{MFR}$ of 10.3 g/10 min, a density of 0.895 g/cm$^3$ and $\overline{Mw}/\overline{Mn}$ of 2.3 was obtained.

EXAMPLE 47

The polymerization of Example 45 was repeated except that in place of the

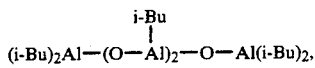

there was used 1.0 mg atom-Al of isobutylaluminoxane (molecular weight 1090 measured by cryoscopic method), whereby 84.2 g of an ethylene/4-methyl-1-pentene copolymer having $\overline{MFR}$ of 12.5 g/10 min, a density of 0.899 g/cm$^3$ and $\overline{Mw}/\overline{Mn}$ of 2.4 was obtained.

EXAMPLE 48

Polymerization

A 2 liter stainless steel autoclave thoroughly purged with nitrogen was charged with 900 ml of 4-methyl-1-pentene, followed by rise in temperature up to 50° C. To the autoclave were added 0.22 ml of a suspension of the benzene-insoluble organoaluminum oxy-compound prepared in Example 1 in toluene (0.44 mole-Al/l), 0.5 ml of a solution of an aluminoxane having at least one hydrocarbon group other than n-alkyl group bonded to the aluminum atom,

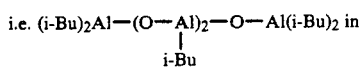

toluene (1 mole-Al/l) and 0.5 ml of a polution of triisobutyl aluminum in toluene (1 mole-Al/l).

After elevating the temperature to 75° C., 1 ml of a solution of bis(methylcyclopentadienyl)zirconium dichloride in toluene (0.001 mole-Zr/l) was injected, together with ethylene, into the autoclave to initiate polymerization. The polymerization was carried out at the total pressure of 8 kg/cm$^2$-G and 80° C. for 40 minutes while continuously feeding ethylene thereto, whereby 84.0 g of an ethylene/4-methyl-1-pentene copolymer having $\overline{MFR}$ of 0.95 g/10 min, a density of 0.886 g/cm$^3$ and $\overline{Mw}/\overline{Mn}$ of 2.3 was obtained

COMPARATIVE EXAMPLE 18

The polymerization of Example 48 was repeated except that in place of the benzene-insoluble organoaluminum oxy-compound, there was used 0.1 mg atom in terms of Al atom of the aluminoxane prepared in Example 1, whereby 42.1 g of an ethylene/4-methyl-1-pentene copolymer having $\overline{MFR}$ of 0.88 g/10 min, density of 0.890 g/cm$^3$ and $\overline{Mw}/\overline{Mn}$ of 2.3 was obtained.

COMPARATIVE EXAMPLE 19

The polymerization of Example 48 was repeated except that in place of the benzene-insoluble organoaluminum oxy-compound, there was used 0.5 mg atom in terms of Al atom of the aluminoxane prepared in Example 1, and no

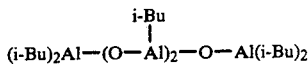

and triisobutyl aluminum were used, whereby 50.1 g of an ethylene/4-methyl-1-pentene copolymer having $\overline{MFR}$ of 9.55 g/10 min, a density of 0.890 g/cm$^3$ and $\overline{Mw}/\overline{Mn}$ of 2.2 was obtained.

EXAMPLE 49

Polymerization

A 500 ml glass autoclave thoroughly purged with nitrogen was charged with 350 ml of toluene and 25 ml of 1-octene and elevated in temperature up to 65° C. Thereafter, while passing ethylene gas therethrough, 0.4 mg atom-Al in terms of aluminum atom of,

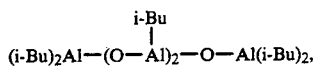

0.1 mg atom in terms of aluminum atom of (i-Bu)$_2$AlOMe, 0.2 mg atom in terms of aluminum atom of the benzene-insoluble organoaluminum oxy-compound prepared in Example 2 and 0.002 mmole of bis(cyclopentadienyl)zirconium dichloride were successively added to the autoclave to initiate polymerization. The polymerization was carried out at 70° C. for 30 minutes while continuously feeding ethylene gas thereto, whereby 11.6 g of ethylene/1-octene copolymer having $\overline{MFR}$ of 4.56 g/10 min, a density of 0.904 g/cm$^3$ and $\overline{Mw}/\overline{Mn}$ of 2.3 was obtained.

EXAMPLE 50

Polymerization

The polymerization of Example 48 was repeated except that in place of the benzene-insoluble organoaluminum oxy-compound prepared in Example 1, there was used 0.05 mg atom-Al of the benzene-insoluble organoaluminum oxy-compound prepared in Example 3, whereby 80.8 g of an ethylene/4-methyl-1-pentene copolymer having $\overline{MFR}$ of 1.13 g/10 min, a density of 0.887 g/cm$^3$ and $\overline{Mw}/\overline{Mn}$ of 2.2 was obtained.

EXAMPLE 51

Polymerization

A 2 liter stainless steel autoclave thoroughly purged with nitrogen was charged with 600 ml of toluene and 300 ml of 4-methyl-1-pentene, followed by rise in temperature up to 50° C. To the autoclave were added 0.11 ml of a suspension of the benzene-insoluble organoaluminum oxy-compound prepared in Example 1 in toluene (0.44 mole-Al/l), 0.5 ml of a solution of triisobutyl aluminum in toluene(1 mole-Al/l) and 0.5 ml of a solution of an aluminoxane having at least one hydrocarbon group other than n-alkyl group bonded to the aluminum atom, i.e. (i-Bu)₂Al—(O—Al)₂—O—Al(i-Bu)₂ in toluene (1 mole-Al/l).
|
i-Bu After elevating the temperature to 75° C., 0.3 ml of a solution of ethylenebis(indenyl)zirconium dichloride in toluene (0.0005 mole-Zr/l) was injected, together with ethylene, into the autoclave to initiate polymerization. The polymerization was carried out at the total pressure of 8 kg/cm²-G and 80° C. for 40 minutes while continuously feeding ethylene thereto, whereby 95.5 g of an ethylene/4-methyl-1-pentene copolymer having MFR of 15.2 g/10 min, a density of 0.899 g/cm³ and $\overline{M}w/\overline{M}n$ of 2.3 was obtained.

COMPARATIVE EXAMPLE 20

The polymerization of Example 51 was repeated except that in place of the benzene-insoluble organoaluminum oxy-compound, there was used 0.05 mg atom in terms of Al atom of the aluminoxane prepared in Example 1, whereby 53.9 g of an ethylene/4-methyl-1-pentene copolymer having MFR of 10.2 g/10 min, a density of 0.906 g/cm³ and $\overline{M}w/\overline{M}n$ of 2.4 was obtained.

COMPARATIVE EXAMPLE 21

The polymerization of Example 51 was repeated except that in place of the benzene-insoluble organoaluminum oxy-compound, there was used 0.5 mg atom in terms of Al atom of the aluminoxane prepared in Example 1, and no triisobutyl aluminum and i-Bu
|
(i-Bu)₂Al—(O—Al)₂—O—Al(i-Bu)₂ were used, whereby 62.8 g of an ethylene/4-methyl-1-pentene copolymer having MFR of 35.6 g/10 min, a density of 0.897 g/cm³ and $\overline{M}w/\overline{M}n$ of 2.2 was obtained.

EXAMPLE 52

Polymerization

A 500 ml glass autoclave thoroughly purged with nitrogen was charged with 250 ml of toluene and elevated in temperature up to 65° C. while passing propylene gas therethrough. Thereafter, 0.2 mg atom-Al in terms of aluminum atom of i-Bu
|
(i-Bu)₂Al—(O—Al)₂—O—Al(i-Bu)₂, 0.3 mg atom-Al in terms of aluminum atom of (i-Bu)₂Al-O-Al(i-Bu)₂ and 0.5 mg atom in terms of aluminum atom of the benzene-insoluble organoaluminum oxy-compound prepared in Example 2 and 0.005 mmole of ethylenebis(indenyl)zirconium dichloride were successively added to the autoclave to initiate polymerization. The polymerization was carried out at 70° C. for 1 hour while continuously feeding propylene gas thereto, whereby 16.2 g of isotactic polypropylene having an intrinsic viscosity [η] of 0.29 dl/g as measured at 135° C. in decalin and $\overline{M}w/\overline{M}n$ of 2.1 was obtained.

COMPARATIVE EXAMPLE 22

The polymerization of Example 52 was repeated except that in place of the benzene-insoluble organoaluminum oxy-compound, there was used 2.5 mg atom in terms of aluminum atom of the aluminoxane prepared in Example 1, and no i-Bu
|
(i-Bu)₂Al—(O—Al)₂—O—Al(i-Bu)₂ and (i-Bu)₂Al-O-Al(i-Bu)₂ were used, whereby 12.0 g of isotactic polypropylene having an intrinsic viscosity [η] of dl/g and $\overline{M}w/\overline{M}n$ of 1.9 was obtained.

What is claimed is:

1. An olefin polymerization catalyst component comprising an organoaluminum oxy-compound having less than 10% in terms of Al atom of Al component dissolving in benzene kept at 60° C., a ratio (D₁₂₆₀/D₁₂₂₀) of an absorbance (D₁₂₆₀) at 1260 cm⁻¹ to an absorbance (D₁₂₂₀) at 1220 cm⁻¹, both obtained by infrared spectrophotometry, of less than 0.09, and the organoaluminum oxy-compound being prepared by bringing a solution of aluminoxane into contact with water or an active hydrogen containing compound.

2. An olefin polymerization catalyst component comprising an organoaluminum oxy-compound having less than 10% in terms of Al atom of Al component dissolving in benzene kept at 60° C., a ratio (D₁₂₆₀/D₁₂₂₀) of an absorbance (D₁₂₆₀) at 1260 cm⁻¹ to an absorbance (D₁₂₂₀) at 1220 cm⁻¹, both obtained by infrared spectrophotometry, of less than 0.09, and the organoaluminum oxy-compound being prepared by bringing a solution of organoaluminum compound into contact with water, wherein the water is used in such an amount that the organoaluminum atoms dissolved in the reaction system become less than 20% based on the total organoaluminum atoms.

3. The olefin polymerization catalyst component as claimed in claim 1 or claim 2 wherein the Al component dissolving in benzene kept at 60° C. is less than 2% in terms of Al atom.

4. An olefin polymerization catalyst comprising
an organoaluminum oxy-compound having less than 10% in terms of Al atom of Al component dissolving in benzene kept at 60° C., as claimed in claim 1 or claim 2 and
a transition metal compound containing a ligand having a cycloalkadienyl skeleton.

5. The olefin polymerization catalyst as claimed in claim 4 wherein the transition metal compound is a transition metal compound containing at least two ligands having a cycloalkadienyl skeleton, said ligands being bonded together through lower alkylene groups.

6. An olefin polymerization catalyst comprising
an organoaluminum oxy-compound having less than 10% in terms of Al atom of Al component dissolving in benzene kept at 60° C., as claimed in claim 1 or claim 1,
a transition metal compound containing a ligand having a cycloalkadienyl skeleton, and
an organoaluminum compound.

7. The olefin polymerization catalyst as claimed in claim 6 wherein the transition metal compound is a transition metal compound containing at least two ligands having a cycloalkadienyl skeleton, said ligands being bonded together through lower alkylene groups.

8. The olefin polymerization catalyst as claimed in claim 6 wherein the organoaluminum compound is an organoaluminum compound represented by the formula R⁶ₘAlX₃₋ₘ wherein R⁶ is hydrocarbon of 1-12 carbon atoms, X is halogen and m is 1-3, or by the formula $R^6{}_nAlY_{3-n}$ wherein $R^6$ is as defined above, Y is hydrogen, $-OR^7$, $-OSiR^8{}_3$, $-OAlR^9{}_2$,

$-NR^{12}{}_2$ or $-SiR^{13}{}_3$, n is 1-2, and $R^7$-$R^{13}$ are each hydrogen, halogen or hydrocarbon.

9. An olefin polymerization catalyst comprising
   an organoaluminum oxy-compound having less than 10% in terms of Al atom of Al component dissolving in benzene kept at 60° C., as claimed in claim 1 or claim 2,
   a transition metal compound containing a ligand having a cycloalkadienyl skeleton, and
   an aluminoxane having at least one hydrocarbon group other than n-alkyl group bonded to the aluminum atom.

10. The olefin polymerization catalyst as claimed in claim 9 wherein the transition metal compound is a transition metal compound containing at least two ligands having a cycloalkadienyl skeleton, said ligands being bonded together through lower alkylene groups.

11. The olefin polymerization catalyst as claimed in claim 9 wherein the hydrocarbon group other than n-alkyl group is branched chain alkyl, cycloalkyl or aryl.

12. An olefin polymerization catalyst comprising
    an organoaluminum oxy-compound having less than 10% in terms of Al atom of Al component dissolving in benzene kept at 60° C., as claimed in claim 1 or claim 2,
    a transition metal compound containing a ligand having a cycloalkadienyl skeleton,
    an organoaluminum compound, and
    an aluminoxane having at least one hydrocarbon group other than n-alkyl group bonded to the aluminum atom.

13. The olefin polymerization catalyst as claimed in claim 12 wherein the transition metal compound is a transition metal compound containing at least two ligands having a cycloalkadienyl skeleton, said ligands being bonded together through lower alkylene groups.

14. The olefin polymerization catalyst as claimed in claim 12 wherein the organoaluminum compound is an organoaluminum compound represented by the formula $R^6{}_mAlX_{3-m}$ wherein $R^6$ is hydrocarbon of 1-12 carbon atoms, X is halogen and m is 1-3, or by the formula $R^6{}_nAlY_{3-n}$ wherein $R^6$ is as defined above, Y is hydrogen, $-OR^7$, $-OSiR^8{}_3$, $-OAlR^9{}_2$,

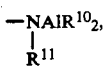

$-NR^{12}{}_2$ or $-SiR^{13}{}_3$, n is 1-2, and $R^7$-$R^{13}$ are each hydrogen, halogen or hydrocarbon.

15. The olefin polymerization catalyst as claimed in claim 12 wherein the hydrocarbon group other than n-alkyl group is branched chain alkyl, cycloalkyl or aryl.

* * * * *

UNITED STATES PATENT AND TRADEMARK OFFICE
CERTIFICATE OF CORRECTION

PATENT NO. : 5,091,352

DATED : February 25, 1992

INVENTOR(S) : MAMORU KIOKA, ET AL.

It is certified that error appears in the above-identified patent and that said Letters Patent is hereby corrected as shown below:

At claim 1, column 34, line 15, "a ratio $(D_{1220}/D_{1220})$" should read --a ratio $(D_{1260}/D_{1220})$--.

Signed and Sealed this

Thirty-first Day of August, 1993

Attest:

BRUCE LEHMAN

Attesting Officer

Commissioner of Patents and Trademarks